United States Patent
Nghiem

(10) Patent No.: US 10,642,652 B2
(45) Date of Patent: May 5, 2020

(54) BEST TRADE-OFF POINT ON AN ELBOW CURVE FOR OPTIMAL RESOURCE PROVISIONING AND PERFORMANCE EFFICIENCY

(71) Applicant: Peter P. Nghiem, Union City, CA (US)

(72) Inventor: Peter P. Nghiem, Union City, CA (US)

( * ) Notice: Subject to any disclaimer, the term of this patent is extended or adjusted under 35 U.S.C. 154(b) by 606 days.

(21) Appl. No.: 15/418,859

(22) Filed: Jan. 30, 2017

(65) Prior Publication Data

US 2017/0220944 A1     Aug. 3, 2017

Related U.S. Application Data

(60) Provisional application No. 62/289,159, filed on Jan. 29, 2016.

(51) Int. Cl.
*G06F 9/48*     (2006.01)
*G06F 9/50*     (2006.01)

(52) U.S. Cl.
CPC ............ *G06F 9/4893* (2013.01); *G06F 9/505* (2013.01); *G06F 9/5066* (2013.01); *G06F 2209/501* (2013.01); *G06F 2209/5019* (2013.01); *Y02D 10/22* (2018.01); *Y02D 10/24* (2018.01); *Y02D 10/36* (2018.01)

(58) Field of Classification Search
CPC ...... G06F 9/4893; G06F 9/505; G06F 9/5066; G06F 2209/501; G06F 2209/5019; Y02D 10/36; Y02D 10/22; Y02D 10/24
See application file for complete search history.

(56) References Cited

PUBLICATIONS

Nghiem, Peter P., and Silvia M. Figueira. "Towards efficient resource provisioning in MapReduce." Journal of Parallel and Distributed Computing 95 (2016): 29-41. (Year: 2016).*
Hartog, J., Fadika, Z., Dede, E., & Govindaraju, M. (Jun. 2012). Configuring a MapReduce framework for dynamic and efficient energy adaptation. In 2012 IEEE Fifth International Conference on Cloud Computing (pp. 914-921). IEEE. (Year: 2012).*
(Continued)

*Primary Examiner* — Vincent Gonzales
*Assistant Examiner* — Silas K Grossberndt
(74) *Attorney, Agent, or Firm* — Michael J. Foycik, Jr.

(57) ABSTRACT

A method, procedure and algorithm are provided for efficient resource provisioning in Hadoop MapReduce. The crux of the method, procedure and algorithm is not tied to any specific system, and can be applied to many processes and devices. It provides a general approach and techniques based on an algorithm with mathematical formulas to find the Best Trade-off Point on an elbow curve, non-inverted or inverted, of performance vs. resources. It is applicable to any systems relying on a trade-off elbow curve for making good decision.

2 Claims, 14 Drawing Sheets

(56) References Cited

PUBLICATIONS

Nghiem, Peter. "Best Trade-Off Point Method for Efficient Resource Provisioning in Spark." Algorithms 11.12 (2018): 190; https//doi.org/10.3390/a11120190.—This new publication in the journal Algorithms by MDPI shows that the invented BToP techniques, algorithm, and method also work properly on Apache Spark, an emerging cluster computing framework completely different than Hadoop MapReduce in terms of architecture and implementation. It is just another example which proves that the BToP method will work as claimed on all systems characterized by an elbow trade-off curve of performance vs. resources to identify the best trade-off point for good decision making.—Following the advice of Chaki Kakali, USPTO Supervisor of Examiners, in the telephone conversation on Sep. 21, 2018, this IDS is filed in compliance with Section 1.56(a) to fulfill Inventor's duty to disclose to the Office his new publication which is material to patentability. The provided item of information, the journal titled "Best Trade-Off Point Method for Efficient Resource Provisioning in Spark" shown above, is not a prior art. It is a new application of the same BToP method on a different cluster computing system, Apache Spark, and therefore, is an additional example of the use of the same invented BToP method. The item of information was published on Nov. 22, 2018 after the utility patent application had been filed on Jan. 30, 2017. It is material to patentability and is consistent with the position taken by the applicant in asserting an argument of patentability of the pending claim.

* cited by examiner

MAPREDUCE JOB EXECUTION ON YARN

Algorithm BestTrade-offPoint for an Elbow Curve $f(x)=(a/x)+b$
Input:  Parameter $a$ for a workload with runtime curve $f(x)=(a/x)+b$
Output:  Optimal number of tasks foreach *incremental slope value* do
    output *number of tasks x=sqrt(-a/slope)*;
end
foreach *incremental slope value* do
    output *acceleration=2a/pow(slope, 3)*;
end
foreach *incremental target value of change in acceleration* do
    foreach *incremental slope value* do
        if *change in acceleration in the current slope increment is >= to the target value AND change in acceleration in the next slope increment is < the target value* then
            output *acceleration, slope and number of tasks*;
            store *number of tasks in an array register*;
            break;
        end
    end
end
foreach *incremental target of change in acceleration* do
    if *numbers of tasks do not change in 8 increments* then
        output *number of tasks as recommended optimal value*;
        break;
    end
end

*FIG. 6*

```
# Table of number of tasks over range of slopes from -0.25 to -39.25 for x=sqrt(-a/slope)
# Slope      Teragen 10GB      Teragen 100GB      Teragen 1TB
 -0.25        18.62             58.12              185.66
 -1.25         8.33             25.99               83.04
 -2.25         6.21             19.37               61.89
 -3.25         5.16             16.12               51.50
 -4.25         4.52             14.10               45.04
 -5.25         4.06             12.68               40.52
 -6.25         3.72             11.62               37.14
 -7.25         3.46             10.79               34.48

#Table of acceleration over range of slopes from -0.25 to -39.25 for accele=2a(1/pow(slope,3))
# Slope      Teragen 10GB      Teragen 100GB      Teragen 1TB
 -0.25       11097.60          108096.00          1103321.60
 -1.25          88.78             864.77             8826.57
 -2.25          15.22             148.20             1513.47
 -3.25           5.05              49.20              502.19
 -4.25           2.26              22.00              224.57
 -5.25           1.20              11.67              119.14
 -6.25           0.71               6.92               70.61
 -7.25           0.46               4.43               45.24

# Table of recommended acceleration, slope and optimal number of tasks over range of
incremental changes in acceleration per slope increment from 1 to 70
#Accele        Teragen 10GB            Teragen 100GB           Teragen 1TB
#Change    Accele  Slope  Tasks    Accele  Slope  Tasks    Accele  Slope   Tasks
1           2.26   -4.25   4.52     4.43   -7.25  10.79     5.96   -14.25  24.59
2           5.05   -3.25   5.16     6.92   -6.25  11.62    12.11   -11.25  27.60
3          15.22   -2.25   6.21    11.67   -5.25  12.68    16.01   -10.25  29.00

***************************************************************************
For Teragen 10GB, the recommended number of tasks resources is  6.21
For Teragen 10GB, the recommended number of tasks resources is  8.33
For Teragen 100GB, the recommended number of tasks resources is 16.12
For Teragen 100GB, the recommended number of tasks resources is 19.37
For Teragen 1TB, the recommended number of tasks resources is 37.14
For Teragen 1TB, the recommended number of tasks resources is 40.52
For Teragen 1TB, the recommended number of tasks resources is 45.04
***************************************************************************
First recommended number of tasks for same workload provides highest efficiency
in performance/energy ratio. Subsequent number(s) slightly improves job runtime.
```

*FIG. 9*

```
# Table of number of tasks over range of slopes from -0.25 to -39.25 for x=sqrt(-a/slope)
# Slope      Terasort 10GB    Terasort 100GB    Terasort 1TB
 -0.25          8.82             31.55             111.33
 -1.25          3.94             14.11              49.79
 -2.25          2.94             10.52              37.11
 -3.25          2.45              8.75              30.88
 -4.25          2.14              7.65              27.00
 -5.25          1.92              6.89              24.29
 -6.25          1.76              6.31              22.27
...
#Table of acceleration over range of slopes from -0.25 to -39.25 for accele=2a(1/pow(slope,3))
# Slope      Terasort 10GB    Terasort 100GB    Terasort 1TB
 -0.25         2487.78          31862.78          396631.04
 -1.25           19.99            254.90            3173.85
 -2.25            3.41             43.71             544.08
 -3.25            1.13             14.58             180.53
 -4.25            0.51              6.49              88.73
 -5.25            0.27              3.44              42.83
 -6.25            0.16              2.04              25.38
...
# Table of recommended acceleration, slope and optimal number of tasks over range of
incremental changes in acceleration per slope increment from 1 to 70
#Accele       Terasort 10GB              Terasort 100GB              Terasort 1TB
#Change Accele  Slope  Tasks    Accele  Slope  Tasks       Accele  Slope  Tasks
1         3.41  -2.25  2.94      3.44   -5.25  6.89         5.75  -10.25 17.39
2         3.41  -2.25  2.94      6.49   -4.25  7.65         7.83   -9.25 18.30
3        19.98  -1.25  3.94      6.49   -4.25  7.65        11.04   -8.25 19.38
...
****************************************************************************
For Terasort 10GB, the recommended number of task resources is  3.94
For Terasort 10GB, the recommended number of task resources is  8.82
For Terasort 100GB, the recommended number of task resources is  10.52
For Terasort 100GB, the recommended number of task resources is  14.11
For Terasort 1TB, the recommended number of task resources is  24.29
For Terasort 1TB, the recommended number of task resources is  27.00
For Terasort 1TB, the recommended number of task resources is  30.88
****************************************************************************
First recommended number of tasks for same workload provides highest efficiency
in performance/energy ratio. Subsequent number(s) slightly improves job runtime.
```

*FIG. 10*

Algorithm: BestTrade-offPoint for an Inverted Elbow Curve $f(x)=-(a/x)+b$
Input: Parameter $a$ for a workload with runtime curve $f(x)=-(a/x)+b$
Output: Optimal number of tasks foreach *incremental slope value* do
    output *number of tasks x=sqrt(a/slope)*;
end
foreach *incremental slope value* do
    output *acceleration=-2a/pow(slope, 3)*;
end
foreach *incremental target value of change in acceleration* do
    foreach *incremental slope value* do
        if *change in acceleration in the current slope increment is >= to the target value AND change in acceleration in the next slope increment is < the target value* then
            output *acceleration, slope and number of tasks*;
            store *number of tasks in an array register*;
            break;
        end
    end
end
foreach *incremental target of change in acceleration* do
    if *numbers of tasks do not change in 8 increments* then
        output *number of tasks as recommended optimal value*;
        break;
    end
end

*FIG. 14*

BEST TRADE-OFF POINT ON AN ELBOW CURVE FOR OPTIMAL RESOURCE PROVISIONING AND PERFORMANCE EFFICIENCY

CROSS REFERENCE TO RELATED APPLICATIONS

This application claims the priority of Provisional Application No. 62/289,159 filed on Jan. 29, 2016, inventor Peter P. Nghiem, entitled "BEST TRADE-OFF POINT ON AN ELBOW CURVE FOR OPTIMAL RESOURCE PROVISIONING AND PERFORMANCE EFFICIENCY". The entire disclosure of this provisional patent application is hereby incorporated by reference thereto, in its entirety.

STATEMENT REGARDING FEDERALLY SPONSORED RESEARCH OR DEVELOPMENT

Not applicable.

FIELD OF THE INVENTION

The invention relates generally to resource provisioning in software framework and computing systems including but not limited to parallel processing of Big Data by large computer clusters. More specifically, it relates to methods for determining the number of task resources for each different workload to optimally balance performance and energy efficiency.

BACKGROUND OF THE INVENTION

Processing of Big Data is typically performed by large computer clusters using parallel and distributed computing techniques. Resource allocation, i.e., determining how many task resources to provision for a job and how to divide the processing among the different nodes of the cluster, is often a challenge in such processing, since performance depends upon specifics of the data and the nature of the processing being performed on the data. In addition to performance, energy efficiency is also an important criterion to consider when determining resource allocation, further complicating the problem of finding an optimal resource allocation.

U.S. Pat. No. 8,935,702 discloses a technique for parallel processing resource provisioning using collected performance data from job runs to compute an optimal number of nodes. A correlation coefficient is calculated for each performance cause in a model responsive to the cause and effect performance data.

The 2009 Marquette University MS thesis by Thomas S. Wirtz entitled "Energy Efficient Data-Intensive Computing With MapReduce" provides a metric, energy performance efficiency, to assess energy performance in MapReduce. The metric is useful to identify the number of workers to optimize energy efficiency.

These techniques, however, do not teach or suggest calculating an exact optimal number of tasks for a job that provides the best trade-off point between performance and energy efficiency vs. task resources on a runtime elbow curve fitted from sampled executions of the target cluster.

SUMMARY OF THE INVENTION

From the foregoing, it is seen that it is a problem in the art to provide a device, system, or process meeting the above requirements. According to the present invention, a system and process is provided which meets the aforementioned requirements and needs in the prior art.

Specifically, the device according to the present invention provides a system and process for calculating an exact optimal number of tasks for a job that provides the best trade-off point between performance and energy efficiency vs. task resources on a runtime elbow curve fitted from sampled executions of the target cluster.

In one aspect, the invention provides a method for finding an exact optimal number of tasks for a workload as the best trade-off point between runtime performance and energy efficiency vs. task resources on a runtime elbow curve fitted from sampled executions of the target cluster. In addition to Hadoop MapReduce, the techniques could be used in any systems and applications which utilize a trade-off curve as a powerful tool for making good decisions. There are many potential commercial applications in computing, network data routing, cluster microarchitecture, payload of aircraft, vehicle and rocket, lean manufacturing, and cost vs. quality control, just to name a few, which can directly benefit from intelligent optimal resource provisioning to get the most efficient performance.

Following is the outline of sequential steps that a computer system would perform to implement an embodiment of the invention.

1. Complete the configuration and fine tuning of the architecture, software and hardware of the production computer system targeted for calibration.
2. Collect necessary preview job performance data from historical runtime performances or sampled executions on the same target production system, configured exactly as in step 1, as reference points for each workload. For example, in one embodiment, the preview job performance data includes runtime, performance or execution time which is equivalent to the completion time of a job.
3. Curve-fitting the preview data to obtain the fit parameters a and b in the runtime elbow curve function $f(x)=(a/x)+b$, where x is the number of task resources. In one embodiment, for example, x is the number of launched map tasks and launched reduced tasks for Teragen and Terasort, respectively.
4. Input the fit parameter a to the Best-Trade-off-Point algorithm to obtain the recommended optimal number of tasks for a workload as output.
    a. The algorithm computes the number of tasks over a range of slopes from the first derivative of $f(x)=(a/x)+b$ and the acceleration over a range of slopes from the second derivative of $f(x)=(a/x)+b$.
    b. The algorithm applies the Chain rule to search for break points and major plateaus on the graphs of acceleration, slope, and task resources over a range of incremental changes in acceleration per slope increment.
    c. The algorithm extracts the exact number of tasks at the best trade-off point on the elbow curve and outputs it as recommended optimal number of tasks for a workload.
5. Repeat steps 2-4 to gather sufficient resource provisioning data points for different workloads to build a database of resource consumption signatures for subsequent job profiling.
6. Repeat steps 1-5 to recalibrate the database of resource consumption signatures if there are any major changes to step 1.

7. Use the database of resource consumption signatures to match dynamically submitted production jobs to their recommended optimal number of tasks for efficient resource provisioning.

To illustrate another area of application of the invention, the Best Trade-off Point on an inverted elbow curve, also known as a knee curve (negative elbow curve), could be used to find the optimal travel speed for achieving the best miles-per-gallon (MPG) in fuel resource consumption on any individual fuel engine vehicle. There have been many suggestions that the travel speed for best MPG is within the range from 50 to 70 miles per hour. But no one has yet to suggest a viable method for determining the exact optimal travel speed for best MPG which varies from one car to another even on the same model. The optimal travel speed for best MPG depends on many variables including but not limited to car model, engine size, car condition, engine tuning condition, tires, type of fuel, loads, route and weather condition, and so on, just to name a few. Using the invented method and algorithm to determine the Best Trade-off Point on an elbow curve of performance vs. resources, which is an inverted elbow curve of travel speed vs. fuel resources, in this case, the travel speed for best MPG could be accurately and precisely determined for every individual car.

The steps to Implement the Best Trade-off Point Algorithm Approach for efficient fuel resource provisioning in a fuel engine vehicle carrying a certain payload on a specific route and weather condition are basically the same as the ones for the application on a computer system. Following is the outline of sequential steps that a fuel engine system would perform to implement an embodiment of the invention.

1. Complete the tune-up of the fuel engine vehicle targeted for calibration.
2. Collect enough samples of speed performance vs. fuel resource consumption as preview data to plot the inverted elbow curve (knee curve) by running the car at different travel speeds on a specific route and weather condition and take measurements of the corresponding fuel consumption at those speeds. Each payload on a specific route and weather condition will have its own inverted elbow curve of speed performance vs fuel resources.
3. Curve-fitting the preview data to obtain the fit parameters a and h in the inverted elbow curve function $f(x)=-(a/x)+b$, is the number of fuel resources.
4. Input the fit parameter the Best-Trade-off-Point algorithm which is now modeled with $f(x)=-(a/x)+b$ for an inverted elbow curve, to obtain the recommended optimal number of fuel resources for a payload on a specific route and weather condition.
   a. The algorithm computes the number of fuel resources over a range of slopes from the first derivative of $f(x)=-(a/x)+b$ and the acceleration over a range of slopes from the second derivative of $f(x)=-(a/x)+b$.
   b. The algorithm applies the Chain rule to search for break points and major plateaus on the graphs of acceleration, slope, and fuel resources over a range of incremental changes in acceleration per slope increment.
   c. The algorithm extracts the exact number of fuel resources at the best trade-off point on the inverted elbow curve and outputs it as recommended optimal number of fuel resources for a payload on a specific route and weather condition.
5. Repeat steps 2-4 to build a database of resource consumption signatures with different payloads on a specific route and weather condition for subsequent transportation job profiling.
6. If there is any major change to step 1, repeat steps 1-5 to recalibrate the database of resource consumption signatures.
7. Use the database of resource consumption signatures to match transportation jobs to their optimal number of fuel resources for efficient resource provisioning.

These steps for implementing the Best Trade-off Point algorithm approach for efficient resource provisioning are the same for any other types of engine payloads including all vehicles, aircraft/planes/jets, boat/ships, and rockets. This invented method could also be used with the yield curve of various types of securities, the convex iso yield curve, also known as convex isoquant curve, and the indifference curve in economics and manufacturing such as the semiconductor/IC yield curve, the manufacturing quality control curve, and any other types of trade-off curves with elbow shapes, both inverted or non-inverted, for good decision making. The isoquant analysis shows various combinations of factors of production that can produce a certain amount of output. In the convex isoquant curve, the factors can be substituted for each other only up to a certain extent. The invented method can be used to determine the sweet spot on the elbow curve which is the best Trade-off Point between the factors.

In general, the invented method for Best Trade-off Point can also be used in any other types of applications which rely on an elbow curve $f(x)=(a/x)+b$ or an inverted elbow curve $f(x)=-(a/x)+b$ of performance vs resources for good decision making including efficient resource provisioning. An elbow curve is a form of an exponential function with a negative growth rate. It is an exponential decay function $f(x)=(a/x)+b$ where $f(x)$ approaches b instead of zero when x approaches infinity. On the other hand, an inverted elbow curve is a function with inverted exponential growth $f(x)=-(a/x)+b$ where $f(x)$ approaches b instead of infinity when x approaches infinity.

Other objects and advantages of the present invention will be more readily apparent from the following detailed description when read in conjunction with the accompanying drawings.

BRIEF DESCRIPTION OF THE DRAWINGS

FIG. 6 shows an abbreviated listing of program steps, aka pseudocode of algorithm, used in performing the present invention for determining the best trade-off point on an elbow curve.

FIG. 9 is an output in table form, showing number of tasks, acceleration, and recommended acceleration, slope and optimal number of tasks over a range of incremental changes for Teragen.

FIG. 10 is an output in table form, showing number of tasks, acceleration, and recommended acceleration, slope and optimal number of tasks over a range of incremental changes for Terasort

FIG. 14 shows an abbreviated listing of program steps, aka pseudocode of algorithm, used in performing the present invention for determining the best trade-off point on an inverted elbow curve.

DETAILED DESCRIPTION OF THE INVENTION

Figure 1:
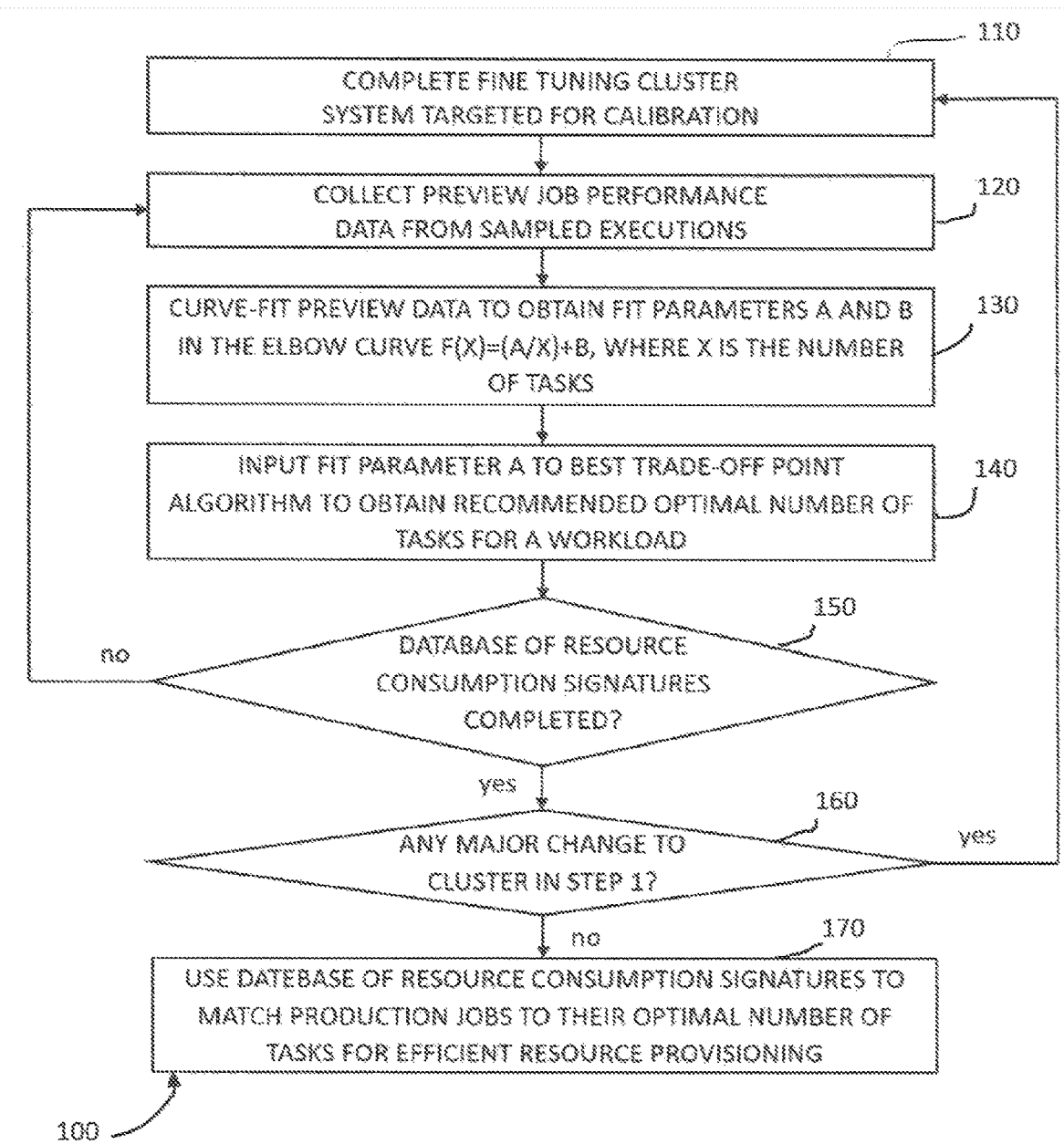
FIG. 1 is a flowchart showing the steps performed in the present invention.

FIG. 1 is a flowchart 100 showing the steps performed in the present invention. Step 110 is to complete fine tuning of the cluster system targeted for calibration.

Step 120 is to collect preview job performance data from sampled executions. Step 130 is to curve-fit the preview data from step 120 to obtain fit parameters A and B in the elbow curve $F(X)=(A/X)+B$, where X is the number of task resources.

Step 140 is to input fit parameter A from step 130 to a Best Trade-Off Point algorithm to obtain recommended optimal number of tasks for a workload.

Step 150 receives the output of Step 140 and makes a decision whether the database of resource consumption signatures is completed. If "no" the flowchart 100 returns to Step 120; if "yes" the flowchart 100 continues to Step 160.

The Step 160 receives the output of Step 150, and makes a decision whether there is any major change to the cluster. If "yes" the flowchart 100 returns to Step 110; if "no" the flowchart 100 continues to Step 170.

Step 170 is to use the database of resource consumption signatures to match production jobs to their optimal number of task resources for efficient resource provisioning.

The crux of the invention is not tied to any specific system. The invention provides a general approach and techniques based on an algorithm with mathematical formula to find the best trade-off point on an elbow curve which is applicable to any systems relying on a trade-off curve for making good decisions. And there are quite a few of them. The potential of commercializing the invention is huge since it touches every area of decision making process which relies on a trade-off curve for good decision making, including but not limited to efficient resource provisioning. Although the invention as presented in the paper is used to optimize resource provisioning in Hadoop MapReduce for performance efficiency, which often corresponds to energy efficiency, it is not limited to that software framework and hardware computing system. As clearly stated, the invention to find the best trade-off point for efficient resource provisioning is applicable whenever there is an elbow curve which is the fundamental trade-off curve. As such, the hardware that the invention could run on depends on the type of application which the invention is implemented on. As an example, for applications with runtime vs. resource trade-off curves, the hardware could be any computing systems including multicore systems, computer cluster, grid computers, network routers, and so on. For applications with horse power, speed, travel distance, payload or weight vs. resource, such as fuel or electricity, trade-off curves, the hardware could be a car engine, jet engine, boat engine or rocket. Not to mention for business applications with cost vs. quality control or delivery time, the underline hardware then becomes a manufacturing or production system.

Figure 2:
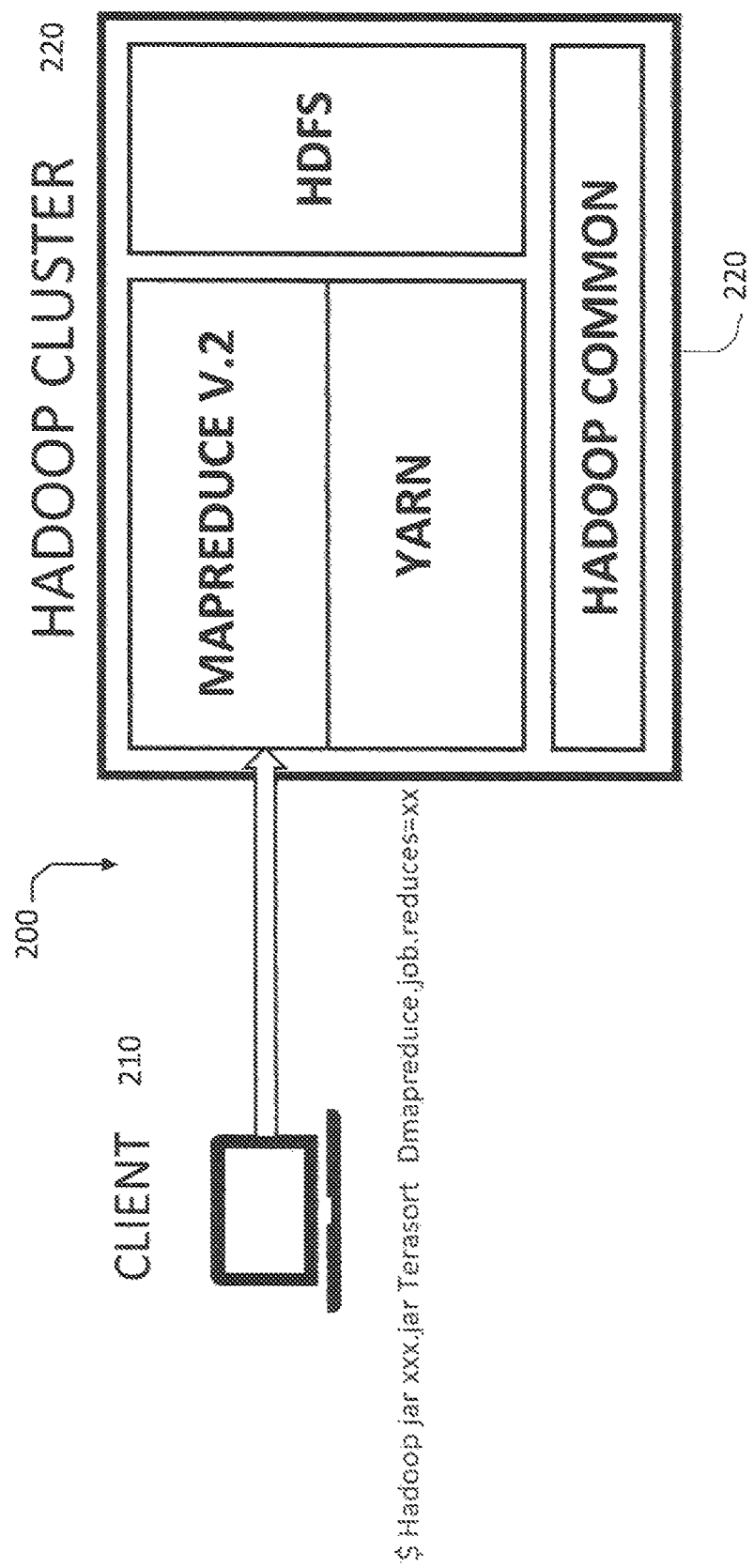
FIG. 2 is a schematic diagram of a HADOOP CLUSTER, known in the art, for use with the steps of FIG. 1 of the present invention.

FIG. 2 is a schematic diagram of a HADOOP CLUSTER 200, known in the art, for use with the steps of FIG. 1 of the present invention. In FIG. 2, a Client 210 communicates with a Hadoop Cluster 220. The Hadoop Cluster 220 shown in FIG. 2 includes MapReduce V.2, HDFS, YARN, and HADOOP COMMON, which are terms known to anyone skilled in this art.

In any event, to tie the invention to a specific hardware used for demonstration, we can use the hardware specifications of the Hadoop Cluster 200 under test. The hardware of the target system running Hadoop MapReduce which is used in the experiment, is described as follows:

The benchmark tests are performed on a 24-node homogeneous Hadoop cluster, with two racks of 12 nodes each, running Cloudera CDH-5.2 YARN (MapReduce v.2).

The NameNodes are VM (virtual machines) of 4 cores and 24 GB of RAM each running on Intel Xeon E5-2690 physical hosts of 8 cores and 16 threads with 2.9 GHz base frequency and 3.8 GHz max turbo frequency, and Thermal Design Power (TDP) of 135 W.

The DataNodes/NodeManagers are a physical system running Intel Xeon E3-1240 v.3 CPUs with 3.4 GHz base frequency and 3.8 GHz max turbo frequency, and TDP of 80 W. Each NodeManager has 4 cores, 8 threads, 32 GB of RAM, two 6 TB hard disks and 1 Gbit network bandwidth. All nodes are connected to a switch with a backplane speed of 48 Gbps.

Figure 3:
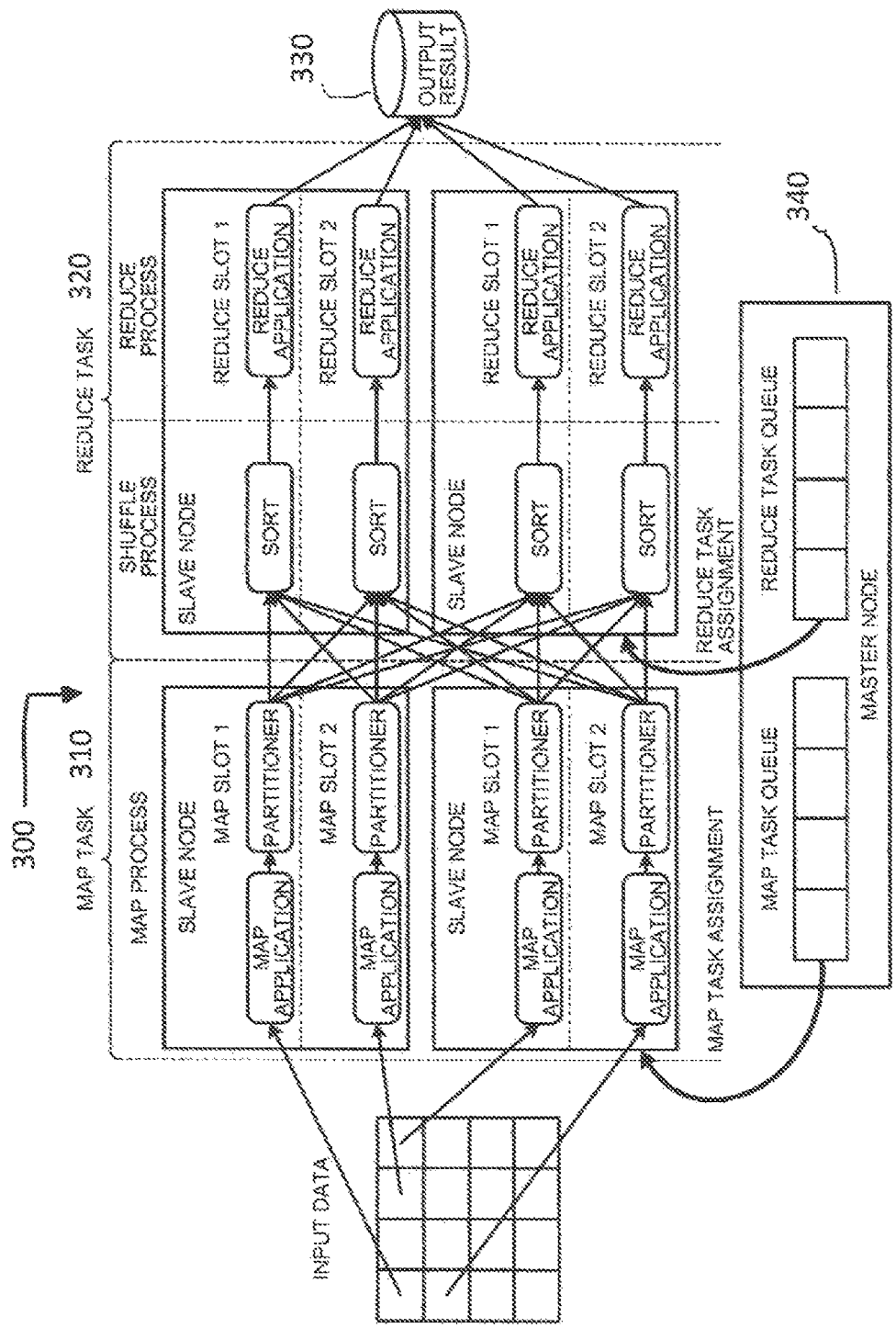
FIG. 3 is a schematic diagram of the dataflow of a MapReduce system, known in the art, for use with the steps of FIG. 1 of the present invention.

The pseudocode of the Best-Trade-off-Point algorithm to ascertain the best trade-off point on an elbow curve for optimal resource provisioning is as shown in FIG. 6, described hereinabove. The steps to implement the invention on the target system is shown in FIG. 1, described hereinabove FIG. 3 is a schematic diagram of a MapReduce system 300, known in the art, for use with the steps of FIG. 1 of the present invention. FIG. 3 is known from FIG. 2 of Kuromatsu et al, U.S. Pat. No. 9,535,743. The system 300 includes input data (unnumbered) supplied to a map task portion 310; a reduce task portion 320; and an output result portion 330. A master node portion 340 provides a map task queue input to map task portion 310, and also provides a reduce task queue to the reduce task portion 320.

Figure 4:
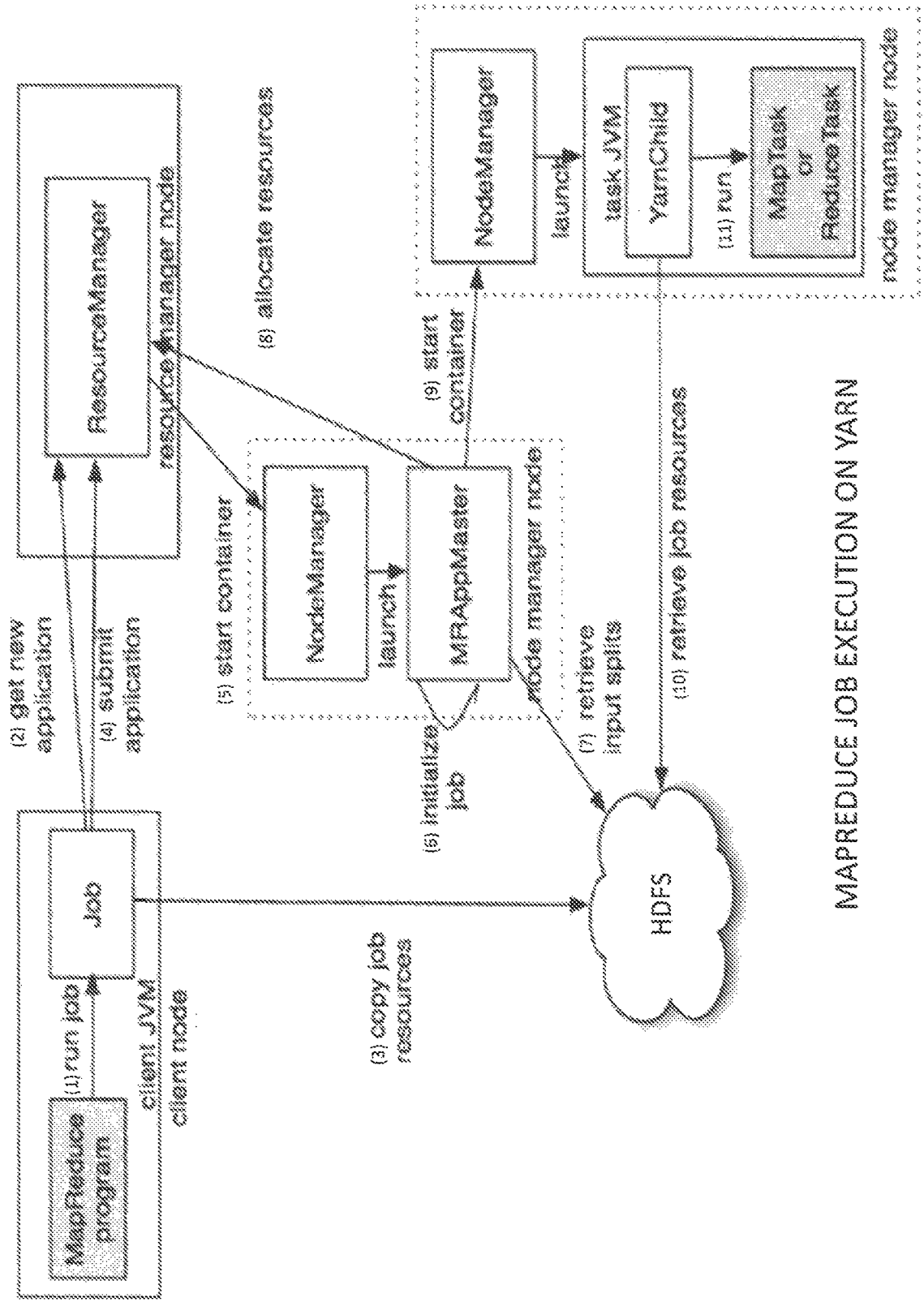
FIG. 4 is a schematic diagram showing how a MapReduce job is executed on a YARN system, known in the art, for use the steps of FIG. 1 of the present invention in conjunction with the systems of FIGS. 2 and 3.

FIG. 4 is a schematic diagram of a YARN system showing a MapReduce job executed on YARN, known in the art, for use the steps of FIG. 1 of the present invention in conjunction with the systems of FIGS. 2 and 3. FIG. 4 is from "How Hadoop runs a MapReduce job on YARN" (from Tom White, Hadoop: The Definite Guide, O'Reilly, 2012).

The elements and features of FIGS. 1-4 are discussed in further detail hereunder.

1. INTRODUCTION

The energy consumption associated with datacenters has risen quickly, and server energy costs over its useful life can now exceed its original capital expenditure [18]. Google, Microsoft, Amazon, Facebook and Yahoo now have several hundred thousand to over a million servers in their datacenter infrastructure. A large portion of datacenter workloads is processed by Hadoop MapReduce, a popular de facto standard framework for Big Data processing, which has been adopted by these world's leading cloud computing providers and top Big Data companies, among many other organizations and institutions. As such, there has been a growing amount of research work dedicated to making MapReduce more energy efficient. However, the issue of how to decide on the right number of task resources for different workloads still has not been resolved. Therefore, Hadoop developers and users have had to rely on popular but inaccurate rules of thumb widely circulated in industry for their MapReduce job execution, leading to significant unintended waste of computing resources and energy.

Several research groups have worked on the performance and energy efficiency of Hadoop MapReduce. Krish et al. [17] present a workflow scheduler for MapReduce framework that profiles the performance and energy characteristics of applications on each hardware sub-cluster in a heterogeneous cluster to improve matching application to resource while ensuring energy efficiency and performance related Service Level Agreement goals. Hartog et al. [11] suggest a MapReduce framework configuration to evaluate node power consumption status and dynamically shift work toward more energy efficient node. Leverich and Kozyrakis [20] propose modifying Hadoop to allow the scaling down of operational dusters by keeping only a small fraction of the nodes running while disabling nodes not in the covering subset to conserve power. Lang and Patel [19] use all the nodes in the Hadoop duster to run a workload and then power down the entire cluster when there is no work as an all-in-strategy. Kaushik and Bhandarkar [16] place classified data into two logical zones of HDFS, where 26% energy consumption reduction is achieved from cold zone power management, and there is room for further energy saving in the under-utilized hot zone. Lin et al, [21] analyze and derive the job energy consumption from the job completion reliability of the general MapReduce infrastructure based on a Poisson distribution to find way to achieve energy-efficient MapReduce environment. Wang et at. [26] use a genetic algorithm with practical encoding and decoding methods, and specially designed genetic operators to support a new MapReduce energy-efficient task scheduling model. Chen et al. [8] show that for MapReduce workloads, where the work rate is proportional to the amount of resources used, improving the performance as measured by traditional metrics such as job duration is equivalent to improving the performance as measured by lower energy consumed. For most systems, decreasing energy consumption is equivalent to decreasing the finishing time.

Among the above research work dedicated to improving the energy efficiency of Hadoop MapReduce, we find that Chen et al. [8]'s publication is the most closely related to our work. [8] suggest a way to answer the question of how many machines to allocate to a particular job by comparing energy consumption of different numbers of machines but do not provide a method to find the exact optimal number. A smaller number of machines always consumes less energy, and takes longer to finish a job unless it has far exceeded the resources required for the job. In this paper, we present a solution for finding the best, trade-off point in performance and energy efficiency. We propose a standard method, formula, and algorithm for obtaining the exact optimal number of tasks for any workload running on Hadoop MapReduce, to provision for performance efficiency based on the actual preview runtime data of the cluster targeted for calibration (FIG. 1).

FIG. 1 is a flowchart showing the steps performed in the present invention.

This invention makes the following contributions:

We develop a job profiling method for optimal resource provisioning for any MapReduce workload by getting runtime samples of the cluster targeted for calibration as reference points for curve-fitting and computation to find the best trade-off point on the runtime elbow curve.

We provide a step-by-step computation process with mathematical formulas for the runtime graph function $f(x)=(a/x)+b$, its first derivative, its second derivative, the Chain rule, and search conditions for breakpoints and major plateaus to find the optimal number of tasks.

We design an algorithm for best trade-off point to take the single parameter a in the graph function $f(x)=(a/x)+b$ for a workload as input and output the exact recommended optimal number of task resources.

We validate our design and techniques using experiments on a real 24-node homogeneous Hadoop cluster with Teragen and Terasort components of the Terasort benchmark test with 10 GB, 100 GB and 1 TB of data.

We verify and compare the results of our algorithm against the numbers of tasks suggested by three currently well-known rules of thumbs widely circulated in industry using the fitted runtime elbow curves. We also provide a numerical example of potential energy savings from the results.

Figure 13:
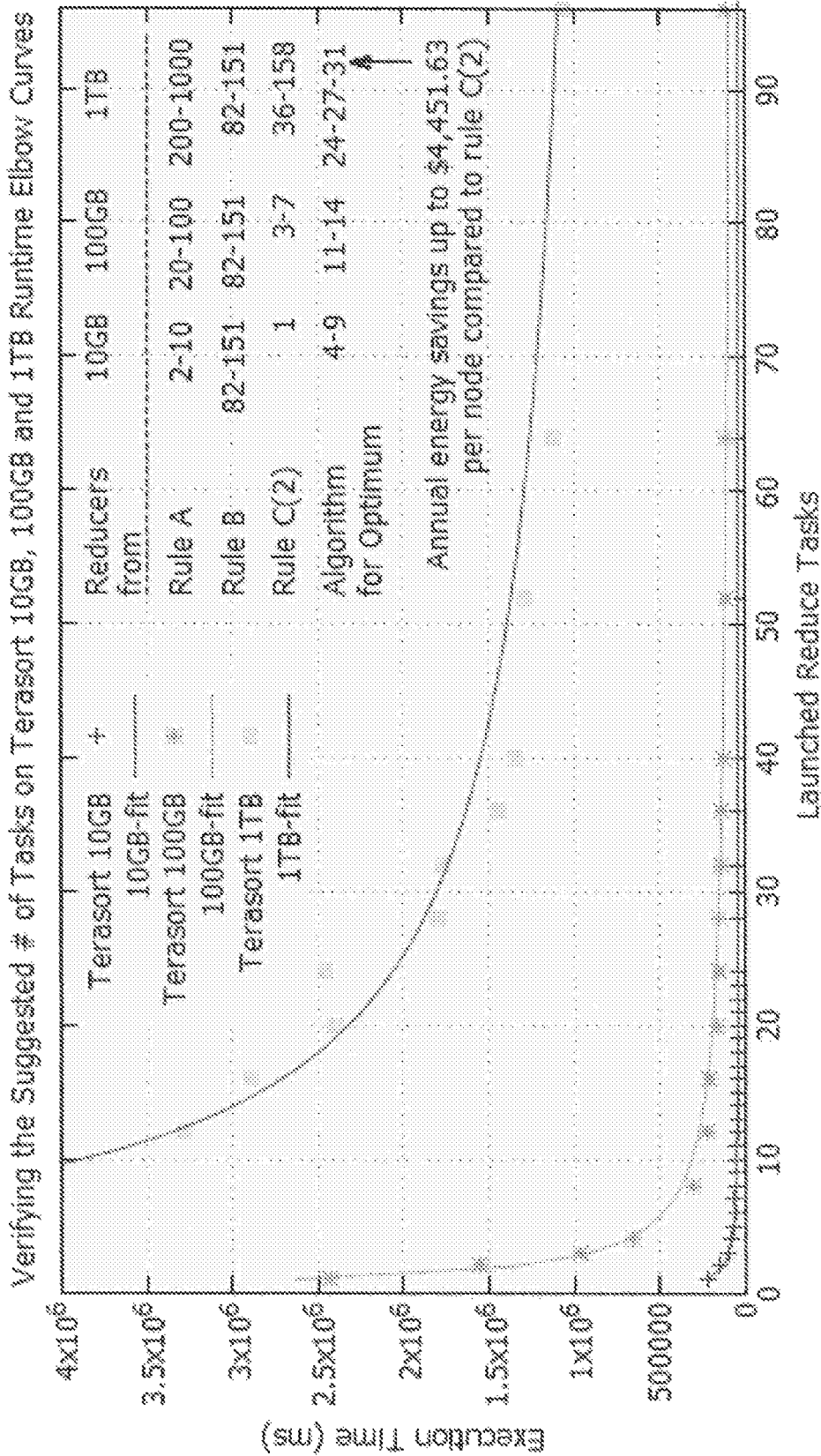
FIG. 13 is a graph showing the comparison and verification of the number of tasks suggested by three rules of thumbs (A, B, and C(2)) and the Best Trade-off Point algorithm on Terasort 10 GB, 100 GB, and 1 TB runtime elbow curves.

The results of our evaluation show that our approach consistently provides accurate and optimal number of task resources for any workload to achieve performance efficiency while the numbers of reduce tasks suggested by the three currently popular rules of thumb are inaccurate leading to significant unintended waste of computing resources and energy shown in FIG. 13 in Section 6.

FIG. 13 is a graph showing the comparison and verification of the number of tasks suggested by three rules of thumbs (A, B, and C(2)) and the Best Trade-off Point algorithm on Terasort 10 GB, 100 GB, and 1 TB runtime elbow curves. FIG. 13 shows the fitted elbow curves of Terasort 10 GB, 100 GB, and 1 TB workloads from sampled executions which verify the accuracy of our algorithm for optimal resource provisioning in contrast to the unreliable number of reducers calculated from three popular rules of thumb (A, B and C(2)), which could lead to significant waste of computing resources and energy. E.g. using our algorithm for optimum, users could obtain an annual energy saving up to $4,451.63 per compute node comparing to for Rule C(2).

The remainder of this paper is organized as follows: Section 2 presents a brief background knowledge on MapReduce. Section 3 introduces MapReduce resource provisioning and related research efforts. Section 4 presents our algorithm for optimal resource provisioning. Section 5 discusses the design, analysis and implementation of our algorithm. Section 6 compares the accuracy and energy efficiency of our algorithm to three popular rules of thumb. Finally, Section 7 concludes our work and proposes future research on other types of applications and parallel processing frameworks running on Hadoop YARN including Apache Spark with its dynamic resource allocation feature.

2. BACKGROUND KNOWLEDGE ON MAPREDUCE

Apache Hadoop [1] and [27] is an open source framework for distributed storage and processing of large sets of data on clusters of commodity hardware. Although Hadoop ecosystem includes several software packages such as HBase, Hive, Mahout, Pig, Scoop, Spark, Storm and others, the base Apache Hadoop 2.0 framework comprises only three key modules: the Hadoop Common which provides file systems and OS level abstractions, the Hadoop Distributed File System (HDFS), and the Hadoop MapReduce engine with YARN (MR v. 2) (FIG. 2). With the addition of YARN in Hadoop 2.0, multiple applications while sharing a common cluster resource management can now be run in parallel by new engines. Hadoop clusters can now be scaled up to a much larger configuration and support iterative processing, graph processing, stream processing, and general cluster computing all at the same time.

FIG. 2 is a schematic diagram of a HADOOP CLUSTER, known in the art, for use with the steps of FIG. 1 of the present invention.

HDFS, which is based on Google File System (GFS), supports large-scale data processing workloads and reliable data storage of several TB on clusters of commodity hardware. It features scalability, high availability, fault tolerance, flexible access, load balancing, tunable replication, and security. HDFS splits files into default blocks of 64 MB or 128 MB, which are distributed among the nodes to provide a very high aggregate bandwidth across the cluster for compute performance and data protection. There is a single master called NameNode, which coordinates access and metadata as a simple centralized management system. There is no data caching error because the NameNode stores all metadata, which include filenames and locations of each file on DataNode, in memory for fast lookup. The DataNode only stores blocks from files. A secondary NameNode, running on a separate machine, periodically merges edit logs with namespace snapshot image stored on disk to prevent the edit log file from growing into a large file. In case of NameNode failure, the saved metadata can rebuild a failed primary NameNode with some data loss since the state of secondary NameNode always lags from the primary NameNode. HDFS with block replication feature is designed to tolerate frequent component failure and is optimized for huge number of very large files on up to several thousand nodes cluster, which are mostly read and appended.

The MapReduce programming model uses parallel and distributed algorithm on a cluster of nodes to process large datasets, unstructured as in a file system or structured as in a database. MapReduce can take advantage of data locality by passing data to each data node within the Hadoop cluster. MapReduce also packages users' MapReduce functions as a Java ARchive (JAR) file and sends it out to each node. The JAR file operates locally on that slice of input on that data node and therefore, reduces the distance over which it must be transmitted. By executing compute at the location of data instead of having data moved to the compute location, traditional network bandwidth bottlenecks could be avoided. The MapReduce framework provides scalability, security and authentication, resource management, optimized scheduling, flexibility, and high availability for a variety of applications in Big Data including but not limited to machine learning, financial analysis, genetic algorithms, natural language processing, signal processing, and simulation.

MapReduce consists of three phases, map, shuffle and reduce, where all values are processed independently. The reduce phase cannot start until the map phase is completely finished. At the map phase, map( ) functions run in parallel, creating different intermediate values from different input datasets: map(input_key, input_value)→list <intermediate_key, intermediate_value>. At the shuffle phase after partitioning, values are exchanged by a shuffle/combine process which runs on mapper nodes as a mini reduce phase on local map output to save bandwidth before sending data to full reducer. At the reduce phase, reduce( ) functions, also running in parallel, aggregate all values for a specific key to a single output to generate a new list of reduced output: list<intermediate_key, intermediate_value>→list<output_key, output_value> (FIG. 3).

FIG. 3 is a schematic diagram of the dataflow of a MapReduce system, known in the art, for use with the steps of FIG. 1 of the present invention.

YARN splits the responsibilities of job tracker and task tracker in MapReduce v.1 into four separate entities in MapReduce v.2 (FIG. 4): (1) The Resource Manager has a built-in scheduler, which allocates resources across all applications based on the applications' resource requirements. (2) The MR Application Master, which negotiates appropriate resource containers from the scheduler and tracks their progress, coordinates and manages each and every instance of MapReduce jobs executed on YARN. (3) The Node Manager, which is responsible for containers, monitors each and every node's resource usage (CPU, memory, disk, network bandwidth) within YARN. (4) The Container allocates and represents resources per node available for each specific application. Thus, the tasks running MapReduce job is coordinated by the MR Application Master, which creates a map task object for each split and a number of reduce task objects determined by the mapreduce.job.reduces property.

FIG. 4 is a schematic diagram showing how a MapReduce job is executed on a YARN system, known in the art, for use the steps of FIG. 1 of the present invention in conjunction with the systems of FIGS. 2 and 3.

The sequential steps of how Hadoop runs a MapReduce job using YARN are shown in FIG. 4. Step (1), a MapReduce job is submitted to a job client. Step (2), the job client requests for a new application ID from ResourceManager. Step (3), the job client checks HDFS to see whether an output has been created for that input and copy the result from HDFS directly if it exists. Otherwise, the job client copies job resources from HDFS. Step (4), the job is submitted to ResourceManager where a Scheduler allocates resources and an Application Manager monitors progress and status of the job. Step (5), ResourceManager contacts a NodeManager to start a new container and launch a MapReduce AppMaster for the job. Step (6), MR AppMaster creates an object for bookkeeping purpose and task management. Step (7), MR AppMaster retrieves the input splits from HDFS and creates a task for each split. Step (8), MR AppMaster decides how to run the MapReduce task. Small jobs can be run on the same JVM on a single node as an Uber task. Large jobs request more resources to be allocated by ResourceManager which gathers information from the heartbeats of NodeManagers to consider data locality in its node allocation. Step (9), MR AppMaster contacts a NodeManager to start a new container for task execution. A YarnChild is launched to run on a separate JVM to isolate user codes from long running system deamons. Step (10), YarnChild retrieves job resources from HDFS. Step (11), YarnChild runs Map task or Reduce task. In every 3 secs, YarnChild sends a progress report to MR AppMaster which aggregates all reports and sends an update directly to the job client. Upon job completion, MR AppMaster and task containers clean up their working states, and terminate themselves to release resources.

3. OPTIMIZATION OF TASK RESOURCE PROVISIONING

In general, allocating a higher number of tasks increases parallelization, framework overhead and load balancing, and minimizes the cost of failures to smaller increments of resources. But too many or too few tasks, whether mappers or reducers, are both detrimental for job performance. When the number of tasks is too large potentially causing resource contention and overall performance degradation, the overhead time spent by all task resources continues to grow while there is no further reduction in job runtime with the gradual increase in number of allocated tasks. When the number of tasks is too little for a workload, the job runtime is extremely high due to resource insufficiency. See the following FIGS. 5A, 5B, and 5C. Our goal is to find the best trade-off point between runtime and task resources to provision for optimal performance and energy efficiency.

Figure 5A:
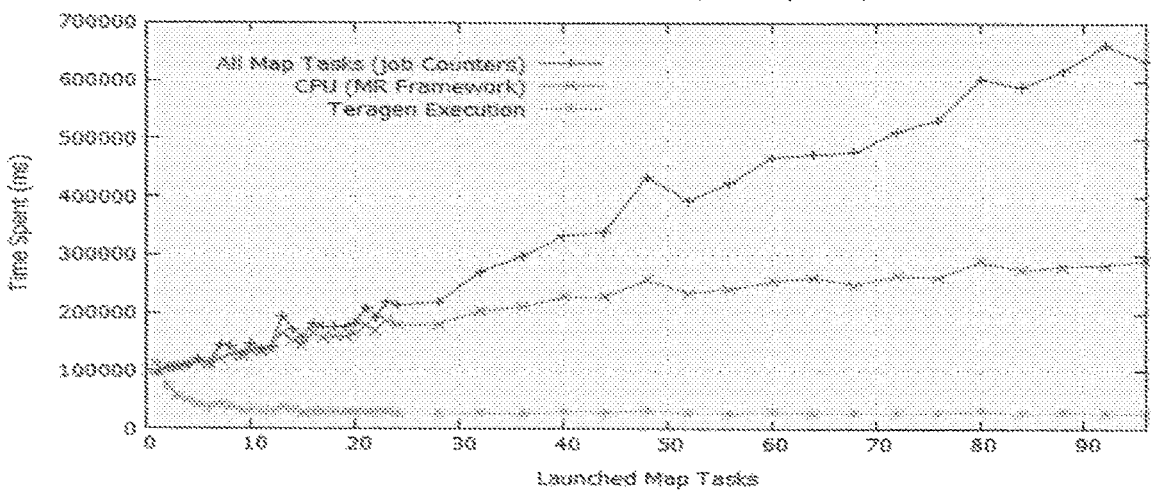
FIG. 5A is a graph of Teragen 10 GB benchmark test results.

FIG. 5A is a graph of Teragen 10 GB benchmark test results.

Figure 5B:
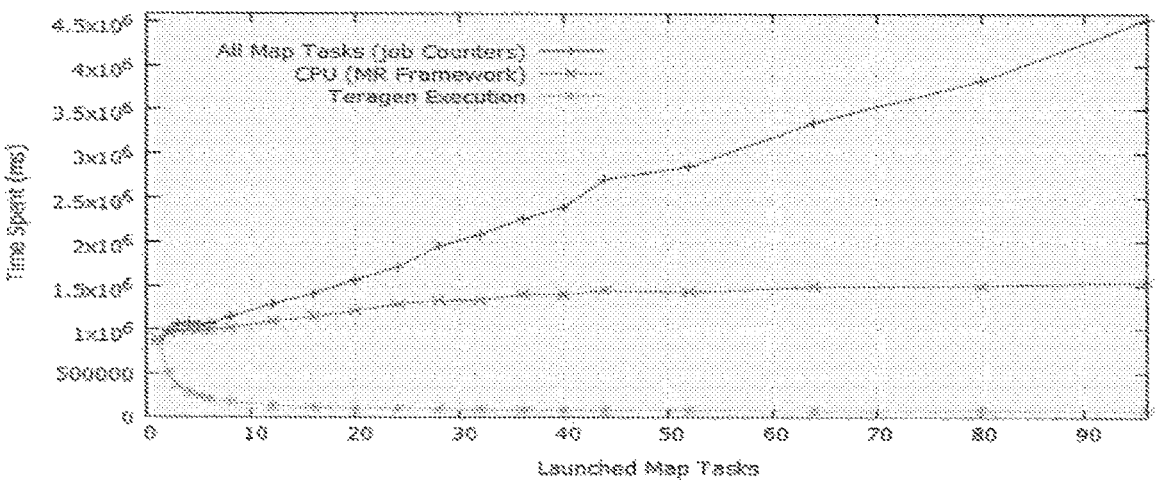
FIG. 5B is a graph of Teragen 100 GB benchmark test results.

FIG. 5B is a graph of Teragen 100 GB benchmark test results.

Figure 5C:
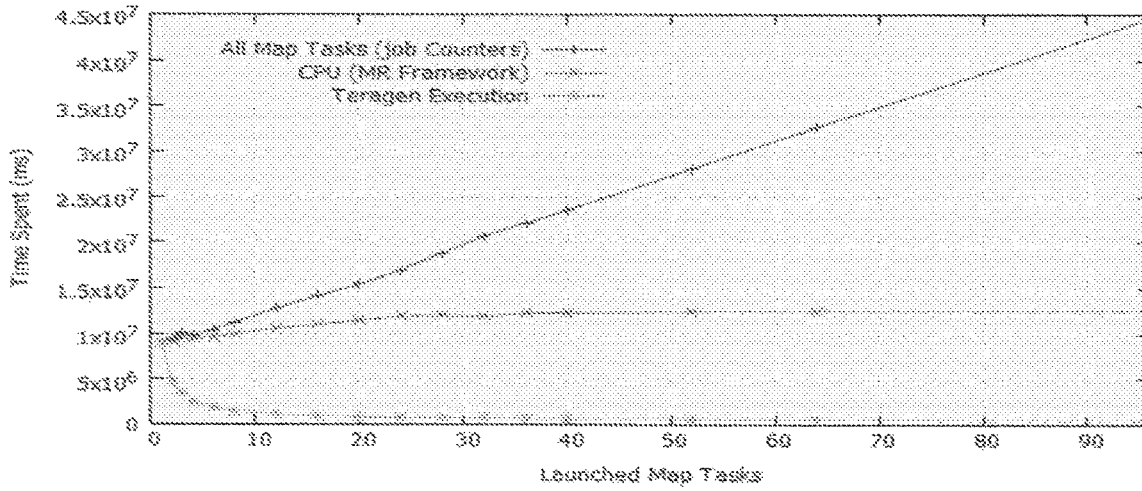
FIG. 5C is a graph of Teragen 1 TB benchmark test results.

FIG. 5C is a graph of Teragen 1 TB benchmark test results.

FIGS. 5A, 5B, and 5C are graphs of time spent by all map tasks, CPU, and Teragen execution versus number of launched map tasks. The runtime elbow curves of Teragen (a) 10 GB, (b) 100 GB and (c) 1 TB workloads plotted at different y-axis scales all appear to have the best trade-off points for performance efficiency at around 10 map tasks. But that is refuted by our algorithm as a visual misperception of different granularities at low magnification.

There are some prior works on MapReduce resource provisioning to achieve certain application performance goals and service level objectives (SLOs) which could be referenced when using our method for obtaining optimal task resources for energy efficient computing.

Babu [6] suggests different techniques for automatic setting of job configuration parameters for MapReduce programs, including dynamic profiling, but acknowledges that this is an inherently difficult research and engineering challenge without knowing the properties of the actual job being processed, its input data, and resource allocation. Herodotou et al. [12] introduce the Elastisizer system to configure the right cluster size matching a workload's performance needs by using an automated technique based on a mix of job profiling and simulation. Verma et al. [25] generate a set of resource provisioning options to meet given SLOs by applying scaling rules to the job past executions or sampled executions from a given application on the set of small input datasets. Kambatla et al. [14] propose a brute force job provisioning approach by analyzing and comparing the resource consumption of the application at hand with a database of similar resource consumption signatures of other applications to calculate the optimum configuration.

For the greater part, these prior research papers on resource provisioning for MapReduce v.1 are still applicable to MapReduce v.2. However, MapReduce v.2 is considerably different than MapReduce v.1 where there are pre-configured static slots for map and reduce tasks, which are inflexible and often leads to an under-utilization of resources. In YARN, the job tracker's role of the previous MapReduce v.1 is now handled by a separate resource manager and history server to improve scalability. The NodeManager in MapReduce v.2, which manages resources and deployment on a node, is now responsible for launching containers. Each container can store a map or reduce task. MapReduce v.2 running on YARN is more scalable with resource utilization configured in terms of physical RAM limit, virtual memory and JVM heap size limit for each task. These improvements allow Hadoop to share resources dynamically between applications in a finer-grained, more practical and scalable resource configuration for better provisioning and cluster utilization (FIG. 4). Along the lines proposed by these prior papers for resource provisioning by job profiles, our research paper further provides an innovative method, formula and algorithm to eliminate the guess-work, and accurately identify the optimal numbers of task resources for different workloads to achieve performance efficiency on any specific Hadoop cluster while minimizing any strenuous brute force.

Obtaining the right number of mappers and reducers for each job has been a challenge for Hadoop MapReduce users since there are lots of variables involved in balancing computing resources with network transfer bandwidth and disk reads. There are more than 180 parameters specified to control the behavior of a MapReduce job in Hadoop and the settings of more than 25 of these parameters can have significant impact on job performance [6] and [14]. However, the optimal number of tasks for a job depends not only on the settings of various parameters and metrics for fine tuning Hadoop cluster performance but also on several other factors including but not limited to the type of application, dataset size and structure, cluster hardware specifications, system setup and configuration, and output buffer size. Therefore, the most practical method to indirectly take all those factors into account is to compute the optimal number of tasks from the actual sampled runtime data of the target cluster.

The number of maps needed for certain job is usually decided by the number of blocks in the job inputs, which varies with the HDFS block size. The current default HDFS block size is 128 MB, an increase from the previous version, which was 64 MB. In some cases, capitalizing on data locality to enlarge the HDFS block size up to 512 MB to store a large input file can reduce runtime for I/O bound jobs.

On the other hand, when mappers are more CPU bound and less I/O bound, reducing the HDFS block size can improve the utilization of computing resources in the cluster. Hence, the total number of mappers running for a particular job actually depends on the number of input splits of the data. According to Hadoop Wiki, the right level of parallelism for maps seems to be around 10-100 maps/node, although it could be taken up to 300 or so for very CPU-light map tasks [3]. Significantly, the number of reducers at the aggregation step is more difficult to estimate since it is not easy to ascertain any spill of intermediate outputs to memory buffer and/or to disk for different workloads. Although there are currently three popular rules of thumb widely circulated in industry for deciding on the optimal number of reducers for a job, none of them provide an accurate and verifiable number of task resources for certain workload as shown in FIG. 13 in Section 6.

FIG. 13 is a graph showing the comparison and verification of the number of tasks suggested by three rules of thumbs (A, B, and C(2)) and the Best Trade-off Point algorithm on Terasort 10 GB, 100 GB, and 1 TB runtime elbow curves. FIG. 13 shows the fitted elbow curves of Terasort 10 GB, 100 GB, and 1 TB workloads from sampled executions which verify the accuracy of our algorithm for optimal resource provisioning in contrast to the unreliable number of reducers calculated from three popular rules of thumb (A, B and C(2)), which could lead to significant waste of computing resources and energy. E.g. using our algorithm for optimum, users could obtain an annual energy saving up to $4,451.63 per compute node comparing to for Rule C(2).

4. ALGORITHM FOR OPTIMAL RESOURCE PROVISIONING

We have developed an algorithm as shown in FIG. 6 to search for the best trade-off points on the elbow curve of runtime versus number of launched tasks to overcome the uncertainty of all variables involved in finding the right number of tasks for a job to run in any specific Hadoop cluster. Before applying the algorithm, Hadoop users should first get some sampled executions from their target production system as reference points for each workload.

FIG. 6 shows an abbreviated listing of program steps, aka pseudocode of algorithm, used in performing the present invention for determining the best trade-off point on an elbow curve.

From the shape of the elbow curve of runtime versus task resources, we intuitively recognize its graph function $f(x) = (a/x) + b$, which is confirmed by curve-fitting the preview data to obtain the fit parameters a and b. Using the fit parameter a as input, our program computes the number of tasks over a range of slopes from the first derivative and the acceleration over a range of slopes from the second derivative. Applying the Chain rule to our search algorithm for break points and major plateaus on the graphs of acceleration, slope, and task resources over a range of incremental changes in acceleration per slope increment, our program extracts the exact number of tasks at the best trade-off point on the curve and outputs it as recommended optimal number of tasks for a workload (FIG. 9 and FIG. 10 in Section 5.3).

FIG. 9 is an output in table form, showing number of tasks, acceleration, and recommended acceleration, slope and optimal number of tasks over a range of incremental changes for Teragen. FIG. 9 shows applying the algorithm for best trade-off point to Teragen 10 GB, 100 GB and 1 TB workloads, wherein our program tabulates the number of tasks over range of slopes, acceleration over range of slopes, and recommended acceleration, slope, and optimal number of tasks over range of incremental changes in acceleration per slope increment, to output the final recommended optimal numbers of tasks for each Teragen workload.

FIG. 10 is an output in table form, showing number of tasks, acceleration, and recommended acceleration, slope and optimal number of tasks over a range of incremental changes for Terasort. FIG. 10 shows applying the algorithm for best trade-off point to Terasort 10 GB, 100 GB and 1 TB workloads, in which our program tabulates the number of tasks over range of slopes, acceleration over range of slopes, and recommended acceleration, slope, and optimal number of tasks over range of incremental changes in acceleration per slope increment, to output the final recommended optimal numbers of tasks for each Terasort workload.

This preview method, as job profiling for optimization of task resource provisioning, should work out well in any production environment where most of the jobs frequently submitted are of the same type of applications combined with different sizes of dataset. Hadoop users only need to calibrate the optimal numbers of tasks for each different workload in their production system once to build up a table of signatures and use them for all equivalent jobs. However, if there are subsequent changes made to the cluster's system architecture, hardware setup, and configuration, a recalibration for a new set of optimal number of tasks might be necessary to maintain accuracy and precision. Once a database of signatures has been established, dynamically submitted jobs with different workloads could be quickly matched to their recommended optimal resource values for allocation using nested for-loops or equivalent structure to find resembling applications and datasets. The performance of task resources should be predictable through the job profiling of the same identical cluster-based system.

Therefore, it is possible to provide a single and general approach for automatic provisioning based on each specific system and application. However, users have to establish a database of resource utilization signatures corresponding to workloads for every different application with various sizes of input datasets in advance. This approach relying on behavior replication is best suitable for production environment with repetitive workloads corresponding to the values of identical characteristics within the range of signatures pre-computed during preview stage. It will be difficult and far less accurate to generally provision for a class of applications due to the diversified nature of MapReduce applications. Chen et al. [7], in their development of an empirical workload model using production workload traces from Facebook and Yahoo to generate and replay synthetic workloads, acknowledge that per-workload performance measurements are necessary, and using proxy datasets and map/reduce functions can alter performance behavior considerably. In order to avoid recalibration of their workload model upon any change in the input data, map/reduce function code, or the underlying hardware/software system, [7] exclude system characteristics and system behavior from the workload description. [7]'s method with replay mechanisms, which yield some useful insights by enabling performance comparisons across various system and workload changes, is in contrast with our general approach, which emphasizes on the accuracy of optimal resource provisioning for each particular application running on a specific system.

5. DESIGN, ANALYSIS AND IMPLEMENTATION

5.1. Experimental Background

To illustrate our method for obtaining the optimal number of task resources for different workloads, we use the Teragen and Terasort components of the Terasort benchmark test, which is part of the open source Apache Hadoop distribution, to experiment with 10 GB, 100 GB and 1 TB datasets. The benchmark tests are performed on a 24-node homogeneous Hadoop cluster, with two racks of 12 nodes each, running Cloudera CDH-5.2 YARN (MapReduce v.2). The NameNodes are VM (virtual machines) of 4 cores and 24 GB of RAM each running on Intel Xeon E5-2690 physical hosts of 8 cores and 16 threads with 2.9 GHz base frequency and 3.8 GHz max turbo frequency, and Thermal Design Power (TDP) of 135 W. The DataNodes/NodeManagers are physical system running Intel Xeon E3-1240 v.3 CPUs with 3.4 GHz base frequency and 3.8 GHz max turbo frequency, and TDP of 80 W. Each NodeManager has 4 cores, 8 threads, 32 GB of RAM, two 6 TB hard disks and 1 Gbit network bandwidth. All nodes are connected to a switch with a backplane speed of 48 Gbps.

To sample executions of the Hadoop cluster under test (FIGS. 1 and 2), we use the -Dmapreduce.job.maps=(int num) and -Dmapreduce.job.reduces=(int num) as a hint to the InputFormat to allocate the number of mappers and reducers during command line execution of JAR instead of setting the number of tasks in the code using the JobConf's conf.setNumMapTasks (int num) and conf.setNumReduceTasks (int num). For Teragen, which uses MapReduce programming engine to break up the data to be sorted using a random sequence, we generate 10 GB, 100 GB and 1 TB of data with -Dmapreduce.job.maps set equal to a few reference points between 1 and 96. For Terasort, which uses MapReduce programming engine to sample and sort the data created by Teragen, we sort 10 GB, 100 GB and 1 TB of data with -Dmapreduce.job.reduces set equal to a few reference points between 1 and 96. We observe MapReduce's behaviors in terms of total time spent by all map tasks, total time spent by all reduce tasks, CPU time spent by MapReduce framework, and the job execution time to develop a general formula for obtaining the optimal number tasks for efficient use of available computing resources (FIGS. 5A, 5B, and 5C; and FIGS. 7A, 7B, and 7C).

FIG. 1 is a flowchart showing the steps performed in the present invention.

FIG. 2 is a schematic diagram of a HADOOP CLUSTER, known in the art, for use with the steps of FIG. 1 of the present invention.

FIG. 5A is a graph of Teragen 10 GB benchmark test results.

FIG. 5B is a graph of Teragen 100 GB benchmark test results.

FIG. 5C is a graph of Teragen 1 TB benchmark test results.

FIGS. 5A, 5B, and 5C are graphs of time spent by all map tasks, CPU, and Teragen execution versus number of launched map tasks. The runtime elbow curves of Teragen (a) 10 GB, (b) 100 GB and (c) 1 TB workloads plotted at different y-axis scales all appear to have the best trade-off points for performance efficiency at around 10 map tasks. But that is refuted by our algorithm as a visual misperception of different granularities at low magnification.

Figure 7A:
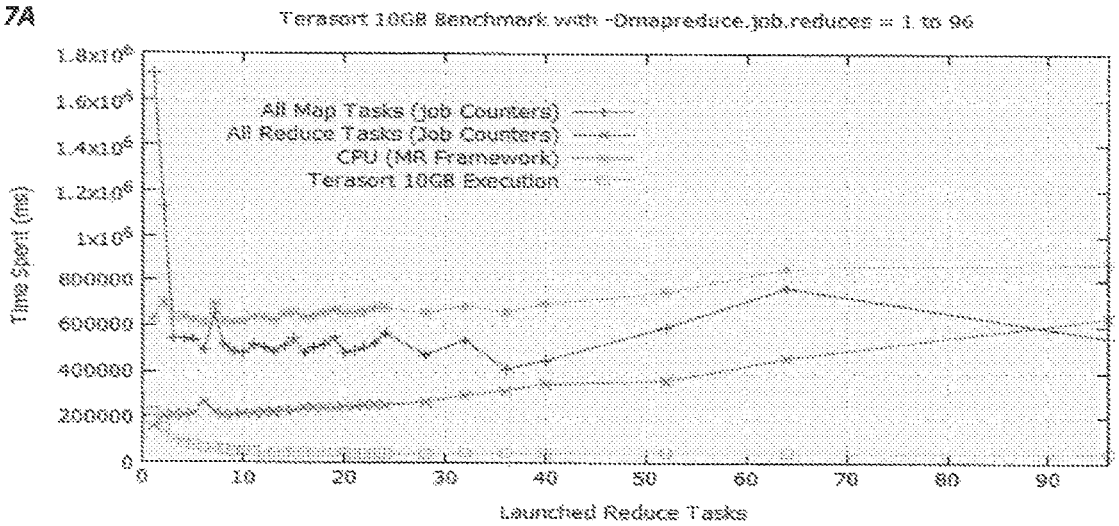
FIG. 7A is a graph of Terasort 10 GB benchmark test results.

FIG. 7A is a graph of Terasort 10 GB benchmark test results.

Figure 7B:
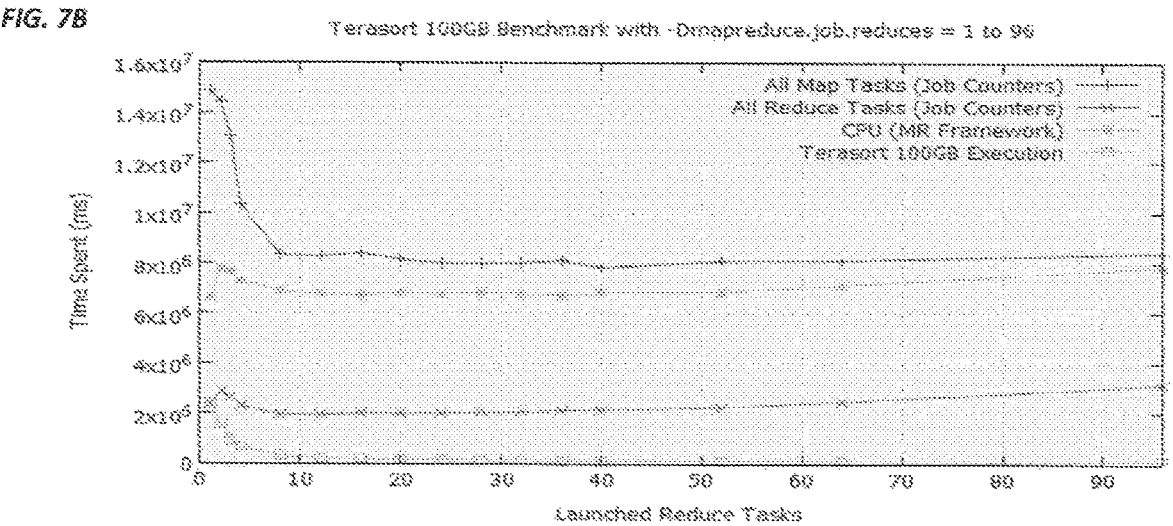
FIG. 7B is a graph of Terasort 100 GB benchmark test results.

FIG. 7B is a graph of Terasort 100 GB benchmark test results.

Figure 7C:
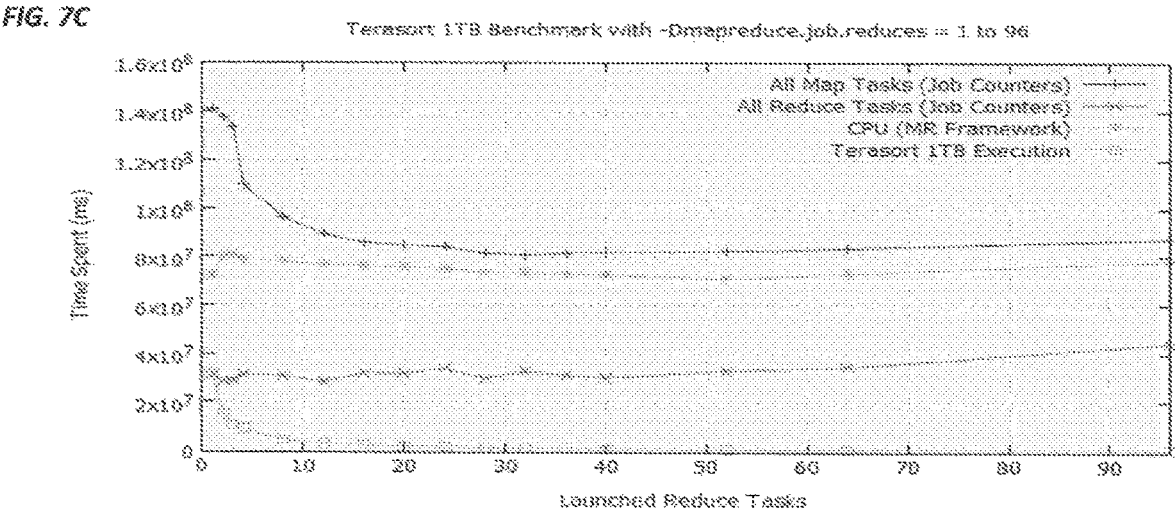
FIG. 7C is a graph of Terasort 1 TB benchmark test results.

FIG. 7C is a graph of Terasort 1 TB benchmark test results.

FIGS. 7A, 7B, and 7C are graphs of time spent by all map tasks, all reduce tasks, CPU, and Terasort execution versus number of launched reduce tasks. The runtime elbow curves of Terasort (a) 10 GB, (b) 100 GB and (c) 1 TB workloads plotted at different y-axis scales all appear to have the best trade-off points for performance efficiency at around 10 reduce tasks. But that is disproved by our algorithm as a visual misperception of different granularities at low magnification.

5.2. Preview Data

Although we performed thorough benchmark tests at numerous data points in our experiment, sampling around over a dozen points, which cover the whole elbow curve, will be sufficient to compute the target optimal task resource values. To get a little smoother graph, increase the number of points for the theoretical curve. Since the graphs of both Teragen and Terasort preview data are plotted at different vertical scales, where the 100 GB and 1 TB plots are around 10 to 100 times lower in magnification than the 10 GB plot, respectively (FIGS. 5A, 5B, and 5C and FIGS. 7A, 7B, and 7C), it appears at first glance that there is no further significant improvement in runtime at the bottom of the elbow curves starting from around 10 launched map tasks and up for all three workloads. But that is a visual misperception of different granularities at low magnification since our algorithm shows that the best trade-off points are actually located at higher numbers of tasks, especially for large workloads.

In both component benchmark tests (FIGS. 5A, 5B, and 5C and FIGS. 7A, 7B, and 7C), the CPU time spent by MapReduce framework increases with the number of task resources since there is more framework overhead. There is no plot of CPU time spent on reduce tasks in Teragen since it only breaks up the data to be sorted by Terasort and does not do any aggregation. For Terasort, we are only concerned about the time spent by all reduce tasks. We let mappers be allocated by MapReduce in Terasort based on the number of blocks in the input dataset previously generated by Teragen. The number of mappers for a given workload is driven by the number of input splits, and not by the -Dmapreduce.job.maps parameter set at the command line JAR execution. For each input split, a map task is spawned by MapReduce framework. Thus, 80 mappers are spawned from 10 GB/128 MB=10*1024 MB/128 MB=80 input splits for Terasort 10 GB, and that number increases to 800 and 8192 mappers for Terasort 100 GB and 1 TB, respectively.

As expected, the job execution time increases with larger workload and decreases with a higher number of launched tasks. However, assigning more tasks than necessary for a job will result in waste of computing resources since the reduction in execution time quickly decreases and becomes insignificant after the needed task resource value has been reached.

5.3. Process for Ascertaining Optimal Number of Tasks

The best trade-off point on the runtime elbow curve should be the location where no further significant decrease in execution time could be obtained by continuing to increase the number of launched tasks. Since the rate of descending of the execution time is the downhill slope of the graph, the target point could be found in the area where the slope is gentle and no longer steep, and the vertical movement has diminished close to almost flat. To find the slope, we take the derivative of the polynomial function $$f(x) = \left(\frac{a}{x}\right) + b \quad (1)$$

where x is the number of launched map tasks and launched reduced tasks for Teragen and Terasort, respectively. The derivative of $f(x)$ is a slope of a tangent line at a point x on a graph $f(x)$. It is equivalent to the slope of a secant line between two points x and x+Δx on the graph, where Δx approaches 0.

$$f'(x) = \lim_{\Delta x \to 0} (f(x + \Delta x) - f(x))/\Delta x. \quad (2)$$

From (1), $$f'(x) = -ax^{-2} \quad (3)$$

and therefore, $$x = \sqrt{-a/f'(x)} \quad (4)$$

where $f'(x) < 0$ for a downhill slope with a negative value.

Using Gnuplot to curve-fit the preview data points, we obtain the fit parameters a and b of the graph function $f(x) = (a/x) + b$. We then plot the three fitted elbow curves of execution time versus launched tasks for Teragen and Terasort 10 GB, 100 GB and 1 TB workloads (FIGS. 8A and 8B).

Figure 8A:
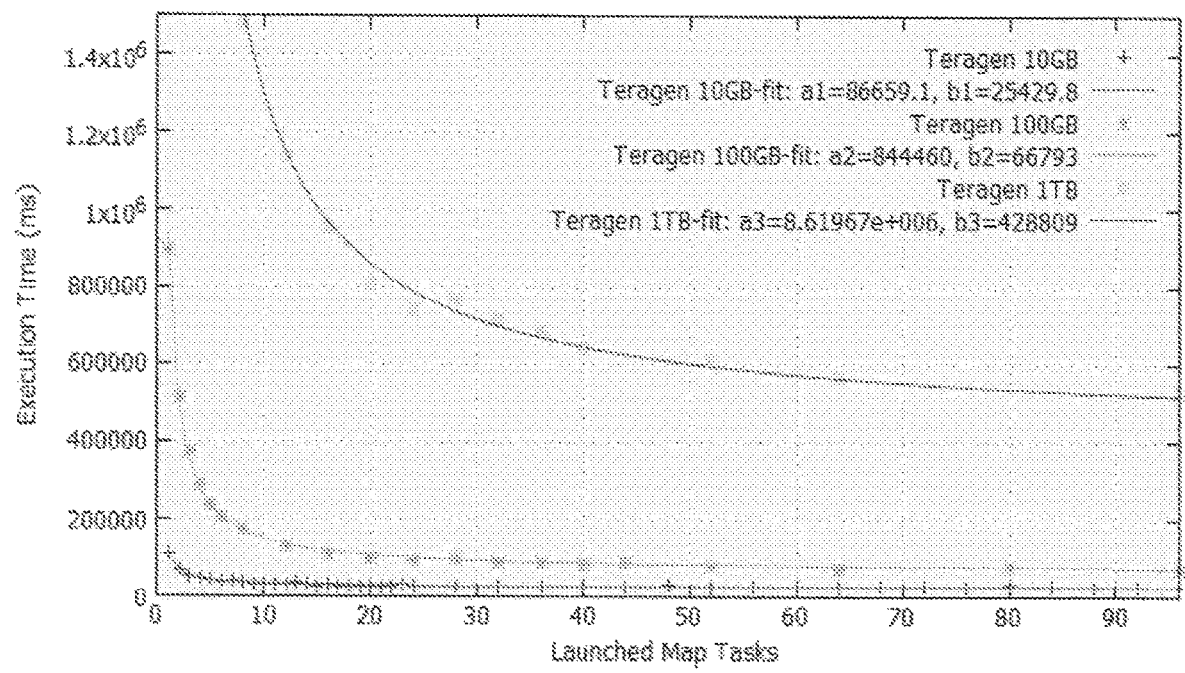
FIG. 8A is a graph of curve-fitting Teragen 10 GB, 100 GB, and 1 TB preview data.

FIG. 8A is a graph of curve-fitting Teragen 10 GB, 100 GB, and 1 TB preview data.

Figure 8B:
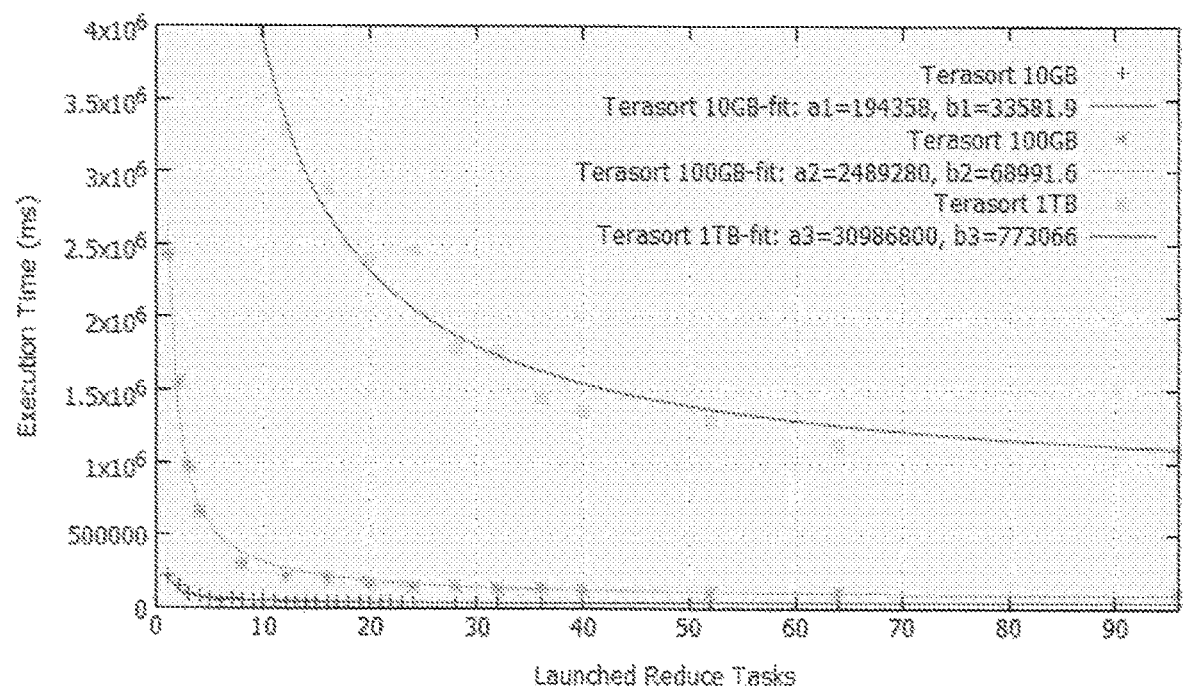
FIG. 8B is a graph of curve-fitting Terasort 10 GB, 100 GB, and 1 TB preview data.

FIG. 8B is a graph of curve-fitting Terasort 10 GB, 100 GB, and 1 TB preview data.

FIGS. 8A and 8B are fitted runtime elbow curves of (a) Teragen and (b) Terasort 10 GB, 100 GB and 1 TB workloads versus number of launched map/reduce tasks, and their fit parameters a and b in the graph function $f(x) = (a/x) + b$.

Taking the second derivative of the function $f(x)$, which is the derivative of the slope, we have the acceleration of the rate of change in number of task resources.

$$f''(x) = f'(f'(x)) \quad (5)$$

$$= \lim_{\Delta x \to 0} \frac{[(f(x + \Delta x) - f(x))/\Delta x] - [(f(x) - f(x - \Delta x))/\Delta x]}{\Delta x} \quad (6)$$

$$= \lim_{\Delta x \to 0} \frac{(f(x + \Delta x) - 2f(x) + f(x - \Delta x))}{\Delta x^2} \quad (7)$$

as the second symmetric derivative.
From (2), $$f''(x) = 2ax^{-3}. \quad (8)$$

Our algorithm finds the optimal number of tasks recommended for a workload by locating the best trade-off point at the bottom of the elbow curve where assigning more task resources no longer significantly reduces the job execution time and therefore, reduces the overall system efficiency in resource utilization and energy consumption. Taking the parameter a in $f(x) = (a/x) + b$ as input, our program computes and tabulates the number of tasks over a range of slopes from −0.25 to −39.25 for $x = \sqrt{-a/\text{slope}}$, and the acceleration over a range of slopes from −0.25 to −39.25 for $f''(x) = 2a \cdot \text{slope}^{-3}$.

Applying the Chain Rule $$\frac{dz}{dx} = \frac{dz}{dy} \cdot \frac{dy}{dx}, \quad (9)$$

the rate of change in acceleration with respect to tasks is $$\frac{d(\text{acceleration})}{d(\text{tasks})} = \frac{d(\text{acceleration})}{d(\text{slope})} \cdot \frac{d(\text{slope})}{d(\text{tasks})}. \quad (10)$$

Our algorithm looks for break points on the graphs to compute a table of recommended acceleration, corresponding slope, and optimal number of tasks, when the change in acceleration in the current slope increment is greater than or equal to the target value of change in acceleration per slope increment, and the change in acceleration in the next slope increment is less than the target value of change in acceleration per slope increment (FIGS. 6, 9, and 10).

FIG. 6 shows an abbreviated listing of program steps, aka pseudocode of algorithm, used in performing the present invention for determining the best trade-off point on an elbow curve.

FIG. 9 is an output in table form, showing number of tasks, acceleration, and recommended acceleration, slope and optimal number of tasks over a range of incremental changes for Teragen. FIG. 9 shows applying the algorithm for best trade-off point to Teragen 10 GB, 100 GB and 1 TB workloads, wherein our program tabulates the number of tasks over range of slopes, acceleration over range of slopes, and recommended acceleration, slope, and optimal number of tasks over range of incremental changes in acceleration per slope increment, to output the final recommended optimal numbers of tasks for each Teragen workload.

FIG. 10 is an output in table form, showing number of tasks, acceleration, and recommended acceleration, slope and optimal number of tasks over a range of incremental changes for Terasort. FIG. 10 shows applying the algorithm for best trade-off point to Terasort 10 GB, 100 GB and 1 TB workloads, in which our program tabulates the number of tasks over range of slopes, acceleration over range of slopes, and recommended acceleration, slope, and optimal number of tasks over range of incremental changes in acceleration per slope increment, to output the final recommended optimal numbers of tasks for each Terasort workload.

Finally, our algorithm searches for all major plateaus lasting at least eight increments of change in acceleration on the graph of task resources versus change in acceleration per slope increment, which corresponds to the graph of slope versus change in acceleration per slope increment and the graph of acceleration versus change in acceleration per slope increment (FIGS. 11A, 11B, and 11C and FIGS. 12A, 12B, and 12C). Our program then outputs the exact optimal numbers of tasks recommended for different workloads (FIG. 9 and FIG. 10). The first recommended number of tasks for the same workload provides the highest efficiency in system performance and energy consumption ratio. The subsequent recommended number(s) of tasks lowers the job runtime a little bit more but at a much less efficient performance/energy ratio. However, increasing the number of tasks beyond the recommended range does not necessarily translate into any further performance gain in execution time.

Figure 11A:
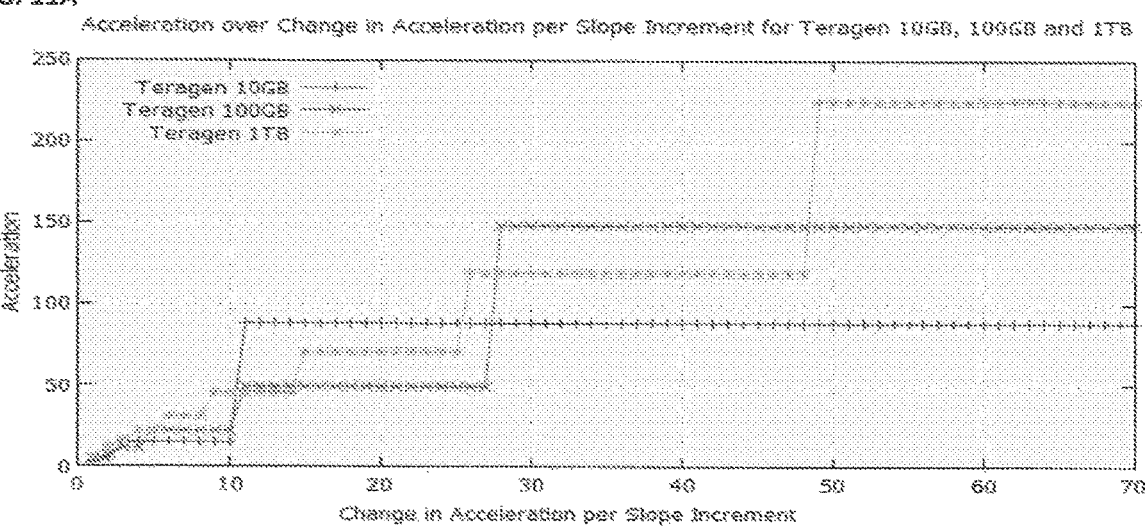
FIG. 11A is a graph of acceleration over change in acceleration per slope increment for Teragen 10 GB, 100 GB, and 1 TB benchmark test results.

FIG. 11A is a graph of acceleration over change in acceleration per slope increment for Teragen 10 GB, 100 GB, and 1 TB benchmark test results.

Figure 11B:
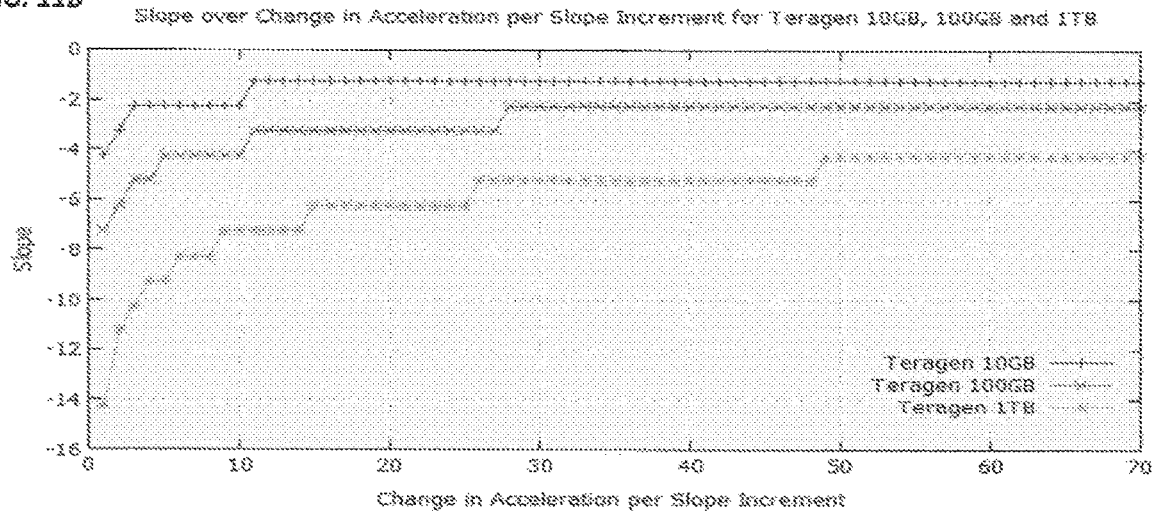
FIG. 11B is a graph of slope over change in acceleration per slope increment for Teragen 10 GB, 100 GB, and 1 TB benchmark test results.

FIG. 11B is a graph of slope over change in acceleration per slope increment for Teragen 10 GB, 100 GB, and 1 TB benchmark test results.

Figure 11C:
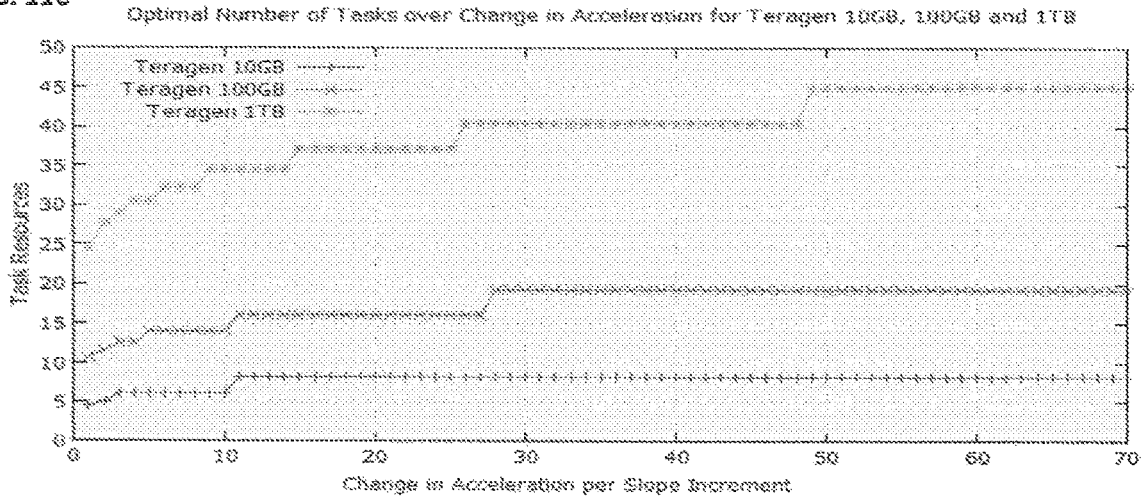
FIG. 11C is a graph of optimal number of tasks over change in acceleration for Teragen 10 GB, 100 GB, and 1 TB benchmark test results.

FIG. 11C is a graph of optimal number of tasks over change in acceleration for Teragen 10 GB, 100 GB, and 1 TB benchmark test results.

FIGS. 11A, 11B, and 11C show the optimal number of tasks for Teragen 10 GB, 100 GB, and 1 TB workloads which are identified by the major plateaus lasting at least eight increments on the graphs. The algorithm searches for break points in the changes in acceleration and outputs: (a) recommended acceleration, (b) corresponding slope and (c) task resources versus change in acceleration per slope increment.

Figure 12A:
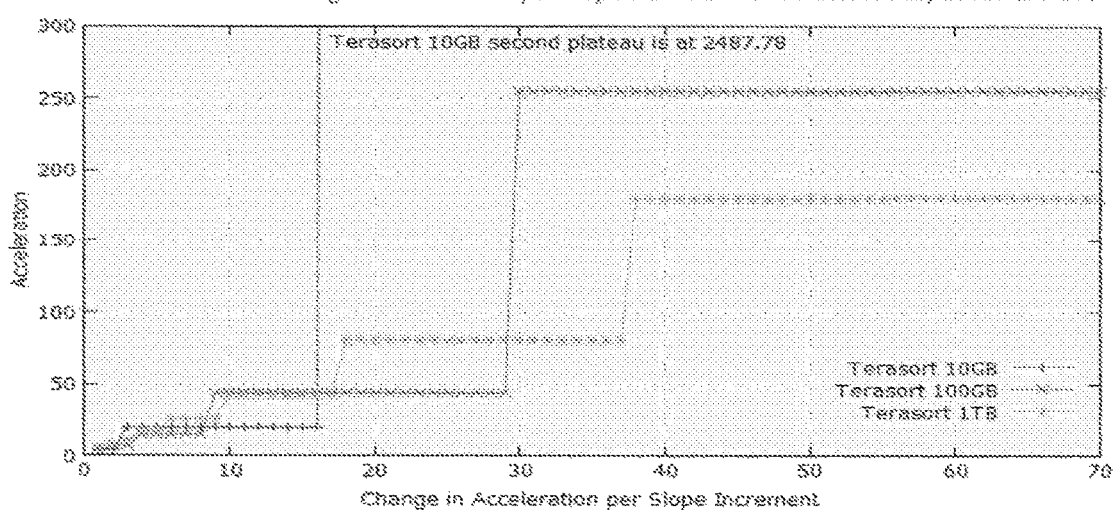
FIG. 12A is a graph of acceleration over change in acceleration per slope increment for Terasort 10 GB, 100 GB, and 1 TB benchmark test results.

FIG. 12A is a graph of acceleration over change in acceleration per slope increment for Terasort 10 GB, 100 GB, and 1 TB benchmark test results.

Figure 12B:
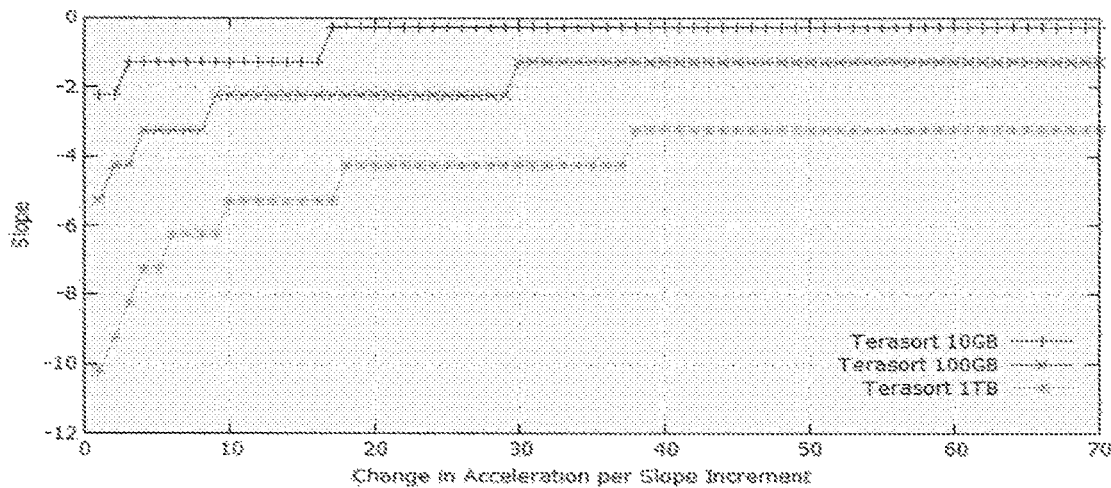
FIG. 12B is a graph of slope over change in acceleration per slope increment for Terasort 10 GB, 100 GB, and 1 TB benchmark test results.

FIG. 12B is a graph of slope over change in acceleration per slope increment for Terasort 10 GB, 100 GB, and 1 TB benchmark test results.

Figure 12C:
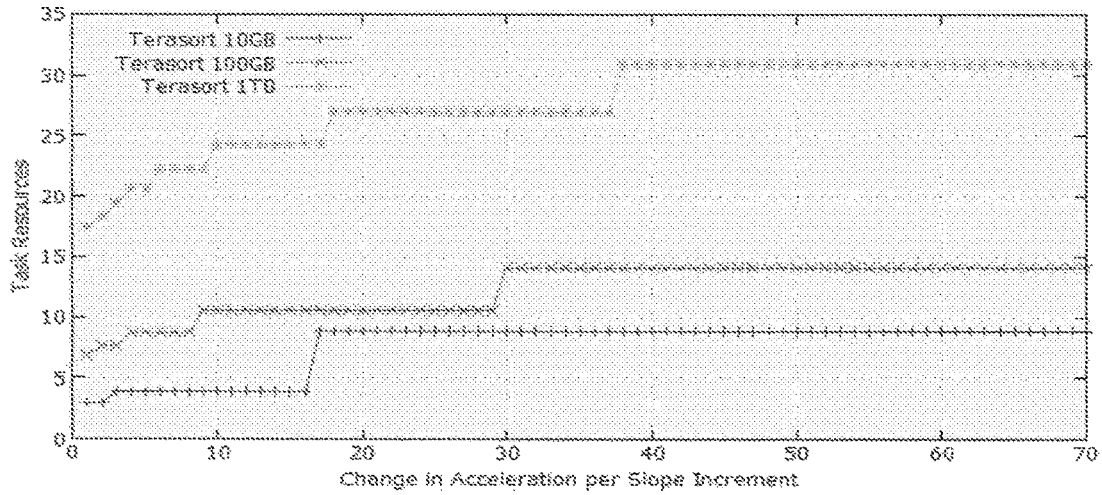
FIG. 12C is a graph of optimal number of tasks over change in acceleration for Terasort 10 GB, 100 GB, and 1 TB benchmark test results.

FIG. 12C is a graph of optimal number of tasks over change in acceleration for Terasort 10 GB, 100 GB, and 1 TB benchmark test results.

FIGS. 12A, 12B, and 12C show the optimal numbers of tasks for Terasort 10 GB, 100 GB and 1 TB workloads which are identified by the major plateaus lasting at least eight increments on the graphs. The algorithm searches for break points in the changes in acceleration and outputs: (a) recommended acceleration, (b) corresponding slope and (c) task resources versus change in acceleration per slope increment.

In summary, the sequential steps to implement our method for optimal resource provisioning in a computer system (FIG. 1) is outlined as follows:

1. Complete the configuration and fine-tuning of the computer system targeted for calibration.
2. Collect preview job performance data from sampled executions on the same target computer system.
3. Curve-fitting the preview data to obtain the fit parameters a and b in the elbow curve function $f(x)=(a/x)+b$, where x is the number of task resources.
4. Input the fit parameter a to our Best-Trade-off-Point algorithm to obtain the recommended optimal number of tasks for a workload.
5. Repeat steps 2-4 to build a database of resource consumption signatures with different workloads for subsequent job profiling.
6. If there is any major change to step 1, repeat steps 1-5 to recalibrate the database of resource consumption signatures.
7. Use the database of resource consumption signatures to match dynamically submitted production jobs to their optimal number of tasks for efficient resource provisioning.

6. VERIFICATION AND COMPARISON TO RULES OF THUMB

The recommended optimal resources for Teragen and Terasort 10 GB, 100 GB, and 1 TB in decimal notation generated by our program should be rounded off to integers before use (FIG. 9 and FIG. 10). Their pinpoint accuracy and integrity are verified by the fitted runtime elbow curves generated from their sampled executions (FIGS. 8A and 8B).

Comparing the reduce task numbers from our algorithm to those suggested by the three popular rules of thumbs, we notice some major discrepancies throughout the workloads not only between our algorithm and the rules of thumb but also between the rules of thumb themselves (FIG. 13).

FIG. 13 is a graph showing the comparison and verification of the number of tasks suggested by three rules of thumbs (A, B, and C(2)) and the Best Trade-off Point algorithm on Terasort 10 GB, 100 GB, and 1 TB runtime elbow curves. FIG. 13 shows the fitted elbow curves of Terasort 10 GB, 100 GB, and 1 TB workloads from sampled executions which verify the accuracy of our algorithm for optimal resource provisioning in contrast to the unreliable number of reducers calculated from three popular rules of thumb (A, B and C(2)), which could lead to significant waste of computing resources and energy. E.g. using our algorithm for optimum, users could obtain an annual energy saving up to $4,451.63 per compute node comparing to for Rule C(2).

From our algorithm for optimum, the recommended numbers of reduce tasks range 4-9 for Terasort 10 GB, 11-14 for Terasort 100 GB, and 24-27-31 for Terasort 1 TB (FIG. 10). These values are not only optimal but also accurate, as verified by the fitted elbow curves in FIG. 13, since they are derived from the sampled job runtimes of the actual cluster-based system targeted for calibration.

According to rule of thumb (A) [15] where the ideal setting for each reduce task to process should be in a range of 1 GB to 5 GB, the suggested range of reducers are 2-10, 20-100 and 200-1000 for Terasort 10 GB, 100 GB and 1 TB, respectively. Apparently, the suggested range of reducers for Terasort 10 GB is close enough but starting at 2 reducers might be a little weak in performance. The ranges of reducers for Terasort 100 GB and 1 TB are not only a bit too wide but also too high causing significant energy waste for no further gain in performance, particularly for 1 TB workload (FIG. 13).

Per Rule of thumb (B) [2], the suggested number of reducers is 0.95*(number of nodes*number of maximum containers per node)=0.095*(24*3.6)=82 or 1.75*(number of nodes*number of maximum containers per node)=1.75*(24*3.6)=151 for better load balancing. For our cluster node of 4 cores, 2 disks and 32 GB of RAM, the maximum number of containers/node=min (2*number of CPU cores, 1.8*number of disks, Total available memory/Minimum container size)=min (2*4, 1.8*2, (32-6 reserved for system) GB/2 GB)=3.6, and the recommended minimum container size for total RAM per node above 24 GB is 2048 MB [13]. These suggested numbers of reducers derived solely from the hardware architecture specifications, without taking into consideration the workloads, are not tailored for performance efficiency since it appears to be based on the misconception that more parallelism is always faster. This rule of thumb suggests an overkill solution for all three Terasort 10 GB, 100 GB and 1 TB workloads. Using more tasks than necessary equates to overloading the NameNode with unused objects and unnecessarily increasing network transfer as well as framework overhead, needless to say wasting computing resources and energy (FIG. 13).

Under Rule of thumb (C) [3], the ideal reducers should be the optimal value that gets them closest to: (1) a multiple of the block size; (2) a task time between 5 and 15 min; (3) creates the fewest files possible. Applying the measurable Rule C(2) of a task time between 300 and 900 s to the benchmark data of our 24-node cluster and their fitted curve functions, the suggested numbers of reducers come out to be 3-7 and 36-158 for Terasort 100 GB and 1 TB, respectively. A value of 1 task is suggested for Terasort 10 GB even though its benchmark task time is below 156 s. None of these values matches the actual optimal range of reducers for Terasort 10 GB, 100 GB and 1 TB workloads. The first value of 36 tasks at the beginning of the range for Terasort 1 TB might be close to the tail end of the actual optimal range of 24-27-31 tasks. But this rule of thumb further suggests an upper range for Terasort 1 TB of up to 158 reducers which is a complete waste of energy with no further improvement in runtime (FIG. 13).

Job runtime is an important metric in MapReduce v.2 since resources are shared by several applications running in parallel on YARN, which allocates maps and reduces as needed by the job dynamically. The energy consumption per job can be computed from the linear sum multiplying job duration by active power and idle duration by idle power [8]. Power models based on a linear interpolation of CPU utilization have been shown to be accurate with I/O workloads for this class of server, since network and disk activity contribute negligibly to dynamic power consumption [20] and [23].

$$\text{Energy}(N) = [\text{Time}_{run}(N) * \text{Power}_{active}(N)] + [\text{Time}_{idle} * \text{Power}_{idle}]. \quad (11)$$

To quantify the potential saving in using our algorithm, we compare the highest recommended numbers of tasks for Terasort 1 TB from our algorithm (31 tasks equivalent to 9 nodes) and the rule of thumb C(2) (158 tasks equivalent to 44 nodes) based on a cluster with a maximum number of containers per node of 3.6 [13]. For an active power consumption per node of 250 W, idle power of 235 W, and an average job arrival time of 2000 s:

$$E(9) = [1{,}773 \text{ s} * (250 \text{ W} * 9)] + [(2{,}000 \text{ s} - 1{,}773 \text{ s}) * 235 \text{ W}]$$
$$= 4{,}042.595 \text{ kJ}$$
$$= 1.123 \text{ kWh per job}$$

$$E(44) = [969 \text{ s} * (250 \text{ W} * 44)] + [(2{,}000 \text{ s} - 969 \text{ s}) * 235 \text{ W}]$$
$$= 10{,}901.285 \text{ kJ}$$
$$= 3.028 \text{ kWh per job}$$

Hence, by provisioning task resources with our algorithm, we reduce the energy consumption by about two-thirds. This translates to (1.905 kWh saved per job)*[((365*24) h/yr)/((2,000/3,600) h/job)]=30,038 kWh saved per year. According to the US Department of Energy, May 2015 average retail price of electricity to commercial customers in California of $0.1482 per kWh, this amounts to an annual saving of $4451.63 per compute node [24].

From the table of number of reducers suggested by different methods under assessment for Terasort 10 GB, 100 GB and 1 TB workloads (FIG. 13), the potential energy savings could be even much larger if we compare the highest recommended numbers of tasks for Terasort 1 TB from our algorithm (31 tasks) and the rule of thumb A (1000 tasks), or the highest recommended numbers of tasks for Terasort 10 GB and 100 GB from our algorithm (9 tasks and 14 tasks, respectively) and the rule of thumb B (151 tasks for both workloads).

Using only the right number of tasks needed for a job will allow users to allocate the remaining resources for other jobs in a multi-tenant Hadoop YARN cluster running at full or near full capacity and therefore, will increase the overall system throughput. Even when the system is lightly loaded, avoiding allocating more tasks than necessary still certainly results in energy saving. Dialing up the number of tasks allocated for a job within the recommended range, users could get a little bit of extra performance gain. However, the continuing slight reduction in execution time quickly disappears while the power consumption expense increases linearly with the number of tasks launched. As such, we do not recommend allocating more task resources beyond the best trade-off points, which offers rapidly diminishing returns, when it comes to runtime performance and energy efficiency.

The computer processor can automatically use the database of resource consumption signatures to match dynamically submitted production jobs to their recommended optimal number of resources for efficient resource provisioning.

7. CONCLUSION AND FUTURE WORK

Our proposed solution for resource provisioning in MapReduce offers a verifiable working method, formula and algorithm to ascertain the optimal task resource values for performance efficiency. The recommended values will always be accurate since they are derived from actual sampled executions of each specific application and system in use. Hadoop MapReduce users no longer must rely on inaccurate rules of thumb to guess the required number of tasks for a job. Although our experiment is conducted on a small-scale 24-node Hadoop cluster, our proposed solution should also work for larger workloads running on a much bigger cluster of several thousands of nodes in today's datacenter. If our proposed method for efficient resource provisioning is adopted and consistently applied to all jobs running on all Hadoop clusters in an organization's datacenter such as the 42,000 compute nodes running Hadoop in Yahoo datacenter, the amount of aggregate annual energy saving will be very significant, up to several million dollars.

Our algorithm for optimum should also work for many other types of parallel processing frameworks running on Hadoop YARN beyond MapReduce such as Apache Spark [4], [10], [29], and [28], which has recently gained its momentum of popularity for in-memory processing of Big Data analytic applications with better sorting performance for large clusters. Spark, which can access to HDFS dataset without being tied to the two-stage MapReduce paradigm, also supports running application JARs in HDFS. Our approach and algorithm for optimum could be used to determine the initial number of executors required for a job at the inceptive stage of Spark's dynamic resource allocation, an important feature available in Spark v.1.2 and up. Unlike a MapReduce task resource, which resides in a process and is immediately killed upon its completion, a Spark task, which is actually a thread residing in a process known as executor, is not released until the long running application is finished. As such, it is necessary for Spark to be able to acquire and release resources during runtime through its dynamic allocation. Spark could relinquish executors when they are no longer used and acquire executors when they are needed according to its mechanism to gracefully decommission an executor by preserving its state before its removal using timeout [22], [5], and [9]. Such elastic resource scaling ability, which is missing in MapReduce, helps prevent under-utilization of cluster resources allocated for an application and starvation of others in a multi-tenant system environment.

Since Spark could process large-scale data up to 100× faster than Hadoop MapReduce in memory, or 10× faster on disk, and it can dynamically adjust the number of executors allocated to the application based on the workload, the additional small gain in efficient performance through a more optimized initial number of executors might not be desirable considering the extra work involved in building an extensive database of signatures for this further optimization. Users will have to weigh the benefits in each specific case to determine applicability and best practices. In general, our algorithm to compute the best trade-off point for optimization of resource provisioning is applicable whenever there is a runtime elbow curve.

These steps for implementing the Best Trade-off Point algorithm approach for efficient resource provisioning could be also used with any other types of software components or data processing engines in Hadoop ecosystem, any computing system, any network data routing system, any cluster microarchitecture system, any payload engine system including but not limited to vehicle, aircraft/plane/jet, boat/ship, and rocket, any lean manufacturing system, any cost vs quality control system, any elbow yield curve system including but not limited to yield curve for various types of securities, convex isoquant curve, semiconductor/IC yield curve, economics yield curve, and production/manufacturing quality control curve.

In general, the invented method for Best Trade-off Point can be used in any other types of applications which rely on an elbow cu $f(x)=(a/x)+b$ or an inverted elbow curve $f(x)=-(a/x)+b$, of performance vs resources for good decision making including efficient resource provisioning. An elbow curve is a form of an exponential function with a negative growth rate. It is an exponential decay function $f(x)=(a/x)+b$ where $f(x)$ approaches h instead of zero when x approaches infinity. On the other hand, an inverted elbow curve is a function with inverted exponential growth $f(x)=-(a/x)+b$ where $f(x)$ approaches b instead of infinity when x approaches infinity.

Another Area of Application of the Invention

To illustrate another area of application of the invention, the Best Trade-off Point on an inverted elbow curve, also known as a knee curve (negative elbow curve), could be used to find the optimal travel speed for achieving the best miles-per-gallon (MPG) in fuel resource consumption on any individual fuel engine vehicle. There have been many suggestions that the travel speed for best MPG is within the range from 50 to 70 miles per hour. But no one has yet to suggest a viable method for determining the exact optimal travel speed for best MPG which varies from one car to another even on the same model. The optimal travel speed for best MPG depends on many variables including but not limited to car model, engine size, car condition, engine tuning condition, tires, type of fuel, loads, route and weather condition, and so on, just to name a few. Using the invented method and algorithm to determine the Best Trade-off Point on an elbow curve of performance vs. resources, which is an inverted elbow curve of travel speed vs. fuel resources, in this case, the travel speed for best MPG could be accurately and precisely determined for every individual car.

The steps to Implement the Best Trade-off Point Algorithm Approach for efficient fuel resource provisioning in a fuel engine vehicle carrying a certain payload on a specific route and weather condition are basically the same as the ones for the application on a computer system. Following is the outline of sequential steps that a fuel engine system would perform to implement an embodiment of the invention.

1. Complete the tune-up of the fuel engine vehicle targeted for calibration.
2. Collect enough samples of speed performance vs. fuel resource consumption as preview data to plot the inverted elbow curve (knee curve) by running the car at different travel speeds on a specific route and weather condition and take measurements of the corresponding fuel consumption at those speeds. Each payload on a specific route and weather condition will have its own inverted elbow curve of speed performance vs fuel resources.
3. Curve-fitting the preview data to obtain the fit parameters a and b in the inverted elbow curve function $f(x)=-(a/x)+b$, where x is the number of fuel resources.
4. input the fit parameter a to the Best-Trade-off-Point algorithm which is now modeled with $f(x)=-(a/x)+b$ for an inverted elbow curve (FIG. 14), to obtain the recommended optimal number of fuel resources for a payload on a specific route and weather condition.
   a. The algorithm computes the number of fuel resources over a range of slopes from the first derivative of $f(x)=-(a/x)+b$ and the acceleration over a range of slopes from the second derivative of $f(x)=-(a/x)+b$.
   b. The algorithm applies the Chain rule to search for break points and major plateaus on the graphs of acceleration, slope, and fuel resources over a range of incremental changes in acceleration per slope increment.
   c. The algorithm extracts the exact number of fuel resources at the best trade-off point on the inverted elbow curve and outputs it as recommended optimal number of fuel resources for a payload on a specific route and weather condition.
5. Repeat steps 2-4 to build a database of resource consumption signatures with different payloads on a specific route and weather condition for subsequent transportation job profiling.
6. If there is any major change to step 1, repeat steps 1-5 to recalibrate the database of resource consumption signatures.
7. Use the database of resource consumption signatures to match transportation jobs to their optimal number of fuel resources for efficient resource provisioning.

FIG. 14 shows an abbreviated listing of program steps, aka pseudocode of algorithm, used in performing the present invention for determining the best trade-off point on an inverted elbow curve.

These steps for implementing the Best Trade-off Point algorithm approach for efficient resource provisioning are applicable to any other types of engine payloads including all vehicles, aircraft/planes/jets, boat/ships, and rockets, and any other types of software components or data processing engines in Hadoop ecosystem, any computing system, any network data routing system, any cluster microarchitecture system. This invented method could also be used with the yield curve of various types of securities, the convex iso yield curve, also known as convex isoquant curve, and the indifference curve in economics and manufacturing such as the semiconductor/IC yield curve, the manufacturing quality control curve, and any other types of trade-off curves with elbow shapes, both inverted or non-inverted, for good decision making. The isoquant analysis shows various combinations of factors of production that can produce a certain amount of output. In the convex isoquant curve, the factors can be substituted for each other only up to a certain extent. The invented method can be used to determine the sweet spot on the elbow curve which is the best Trade-off Point between the factors.

In general, the invented method for Best Trade-off Point can be used in any other types of applications which rely on an elbow curve $f(x)=(a/x)+b$ or an inverted elbow curve $f(x)=-(a/x)+b$ of performance vs resources for good decision making including efficient resource provisioning. An elbow curve is a form of an exponential function with a negative growth rate. It is an exponential decay function $f(x)=(a/x)+b$ where $f(x)$ approaches b instead of zero when x approaches infinity. On the other hand, an inverted elbow curve is a function with inverted exponential growth $f(x)=-(a/x)+b$ where $f(x)$ approaches b instead of infinity when x approaches infinity.

The invention being thus described, it will be evident that the same may be varied in many ways by a routineer in the applicable arts. Such variations are not to be regarded as a departure from the spirit and scope of the invention and all such modifications are intended to be included within the scope of the claims.

REFERENCES

[1] Apache Hadoop. http://hadoop.apache.org (Dec. 24, 2015).
[2] Apache Hadoop 2.7.1. MapReduce Tutorial. Reducer: How Many Reduces? http://hadoop.apache.org/docs/current/hadoop-mapreduce-client/hadoop-mapreduce-client-core/MapReduceTutorial.html#Reducer (Sep. 9, 2015).
[3] Hadoop Wiki: HowManyMapsAndReduces. http://wiki.apache.org/hadoop/HowManyMapsAndReduces (Sep. 9, 2015).
[4] Apache Spark. http://spark.apache.org (Dec. 24, 2015).
[5] Apache Spark Dynamic Resource Allocation. http://spark.apache.org/docs/latest/job-scheduling.html#dynamic-resource-allocation (Dec. 24, 2015).
[6] S. Babu, Towards automatic optimization of MapReduce programs, in: Proceedings of the 1st ACM symposium on Cloud computing, 2010.
[7] Y. Chen, A. S. Ganapathi, R. Griffith, R. H. Katz. A methodology for understanding mapreduce performance under diverse workloads. Tech. Rep. UCB/EECS-2010-135, EECS Department, University of California, Berkeley (2010).
[8] Y. Chen, L. Keys, R. Katz. Towards energy efficient mapreduce. EECS Department, Tech. Rep. UCB/EECS-2009-109, University of California, Berkeley (2009)
[9] Cloudera Spark Dynamic Allocation. http://www.cloudera.com/content/www/en-us/documentation/enterprise/latest/topics/cdh_ig_running_spark_on_yarn.html#concept_z df_rbw_ft_unique_1 (Dec. 24, 2015).
[10] Databricks. https://databricks.com/spark/about (Dec. 24, 2015).
[11] J. Hartog, Z. Fadika, E. Dede, M. Govindaraju. Configuring a MapReduce framework for dynamic and efficient energy adaptation, 2012 IEEE 5th Int. Conference on CLOUD, IEEE (2012), pp. 914-921
[12] H. Herodotou, F. Dong, S. Babu. No one (cluster) size fits all: automatic cluster sizing for data-intensive analytics, Proceedings of the 2nd ACM Symposium on Cloud Computing, ACM (2011)
[13] Hortonworks Data Platform. Section 1.11.1. Manually Calculate YARN and MapReduce Memory Configurating Settings. http://docs.hortonworks.com/HDPDocuments/HDP2/HDP-2.0.9.1/bk installing manually book/content/rpm-chap1-11.html (Sep. 9, 2015).
[14] K. Kambatla, A. Pathak, H. Pucha. Towards optimizing hadoop provisioning in the cloud, in: Proc. of the First Workshop on Hot Topics in Cloud Computing, 2009.
[15] S. Karanth. Mastering Hadoop. Advanced MapReduce. The Reduce task. 2014, p. 50.
[16] R. T. Kaushik, M. Bhandarkar. Greenhdfs: towards an energy-conserving, storage-efficient, hybrid hadoop compute cluster, in: Proceedings of the USENIX Annual Technical Conf., 2010, p. 109.
[17] K. R. Krish, M. S. Iqbal, M. M. Rafique, A. R. Butt. Towards energy awareness in Hadoop Proceedings of Fourth International Workshop on Network-Aware Data Management, IEEE Press (2014), pp. 16-22
[18] J. Koomey. Growth in Data Center Electricity Use 2005 to 2010, Analytics Press, Oakland, Calif. (2011)
[19] W. Lang, J. M. Patel. Energy management for mapreduce clusters, Proc. VLDB Endow., 3 (1-2) (2010), pp. 129-139
[20] J. Leverich, C. Kozyrakis. On the energy (in) efficiency of hadoop clusters, ACM SIGOPS Oper. Syst. Rev., 44 (1) (2010), pp. 61-65
[21] J. Lin, F. Leu, Y. Chen. Analyzing job completion reliability and job energy consumption for a general MapReduce infrastructure, J. High Speed Netw., 19 (3) (2013), pp. 203-214
[22] M. Li, J. Tan, Y. Wang, L. Zhang, V. Salapura. SparkBench: a comprehensive benchmarking suite for in memory data analytic platform Spark, Proceedings of the 12th ACM International Conference on Computing Frontiers, ACM (2015), p. 53
[23] S. Rivoire, P. Ranganathan, C. Kozyrakis. A comparison of high-level full-system power models, HotPower, 8 (2008) 3-3
[24] U.S. Energy Information Administration. Electric Power Monthly Data for June 2015. http://www.eia.gov/electricity/monthly/epm_table_grapher.cfm?t=epmt_5_06_a (Sep. 9, 2015).
[25] A. Verma, L. Cherkasova, R. H. Campbell. Resource provisioning framework for mapreduce jobs with performance goals, Middleware 2011, Springer, Berlin, Heidelberg (2011), pp. 165-186
[26] X. Wang, Y. Wang, H. Zhu. Energy-efficient task scheduling model based on MapReduce for cloud computing using genetic algorithm, J. Comput., 7 (12) (2012), pp. 2962-2970
[27] T. White. Hadoop: The Definitive Guide, O'Reilly, 2012.
[28] M. Zaharia, M. Chowdhury, T. Das, A. Dave, J. Ma, M. McCauley, M. J. Franklin, S. Shenker, I. Stoica. Resilient distributed datasets: A fault-tolerant abstraction for in-memory cluster computing, Proceedings of the 9th USENIX conference on Networked Systems Design and Implementation, USENIX Association (2012) pp. 2-2
[29] M. Zaharia, M. Chowdhury, M. J. Franklin, S. Shenker, I. Stoica. Spark: cluster computing with working sets, in: Proceedings of the 2nd USENIX conference on Hot topics in cloud computing, Vol. 10, June 2010, p. 10.

What is claimed is:
1. A method, algorithm or process for calculating an exact optimal number of resources for a job that provides the best trade-off point between performance vs. resources on an elbow curve $f(x)=(a/x)+b$ fitted from sampled executions of the target system, comprising the steps of:
(A) providing a completed configuration and fine tuning of the architecture, software and hardware of a production system targeted for calibration;
(B) collecting necessary preview job performance data from historical runtime performances or sampled executions on said the same targeted production system, configured exactly as in step A, as reference points for each workload;

(C) curve-fitting said preview job performance data to obtain fit parameters a and b in an elbow curve function $f(x)=(a/x)+b$, where x is the number of resources;

(D) inputting said fit parameter a to a Best-Trade-off-Point algorithm to obtain a recommended optimal number of resources for a workload as output, wherein said Best-Trade-off-Point algorithm includes the steps of: computing the number of resources over a range of slopes from the first derivative of $f(x)=(a/x)+b$ and the acceleration over a range of slopes from the second derivative of $f(x)=(a/x)+b$; applying the Chain rule to search for break points and major plateaus on the graphs of acceleration, slope, and task resources over a range of incremental changes in acceleration per slope increment; and extracting the exact number of resources at the best trade-off point on the elbow curve and outputs it as recommended optimal number of resources for a workload;

(E) repeating steps (B)-(D) gather sufficient resource provisioning data points for different workloads to build a database of resource consumption signatures for subsequent job profiling;

(F) repeating steps (A)-(E) to recalibrate said database of resource consumption signatures if there are any major changes to step A; and (G) using said database of resource consumption signatures to match dynamically submitted production jobs to their recommended optimal number of resources for efficient resource provisioning.

2. A method, algorithm or process for calculating an exact optimal number of resources for a job that provides the best trade-off point between performance vs. resources on an inverted elbow curve $f(x)=-(a/x)+b$ fitted from sampled executions of the target system, comprising the steps of:

(A) providing a completed configuration and fine tuning of the architecture, software and hardware of a production system targeted for calibration;

(B) collecting necessary preview job performance data from historical runtime performances or sampled executions on said the same targeted production system, configured exactly as in step A, as reference points for each workload;

(C) curve-fitting said preview job performance data to obtain fit parameters a and b in an inverted elbow curve function $f(x)=-(a/x)+b$, where x is the number of resources;

(D) inputting said fit parameter a to a Best-Trade-off-Point algorithm to obtain a recommended optimal number of resources for a workload as output, wherein said Best-Trade-off-Point algorithm includes the steps of: computing the number of resources over a range of slopes from the first derivative of $f(x)=-(a/x)+b$ and the acceleration over a range of slopes from the second derivative of $f(x)=-(a/x)+b$; applying the Chain rule to search for break points and major plateaus on the graphs of acceleration, slope, and task resources over a range of incremental changes in acceleration per slope increment; and extracting the exact number of resources at the best trade-off point on the inverted elbow curve and outputs it as recommended optimal number of resources for a workload;

(E) repeating steps (B)-(D) gather sufficient resource provisioning data points for different workloads to build a database of resource consumption signatures for subsequent job profiling;

(F) repeating steps (A)-(E) to recalibrate said database of resource consumption signatures if there are any major changes to step A; and (G) using said database of resource consumption signatures to match dynamically submitted production jobs to their recommended optimal number of resources for efficient resource provisioning.

* * * * *